(12) United States Patent  
Sasaki et al.

(10) Patent No.: US 8,730,248 B2  
(45) Date of Patent: May 20, 2014

(54) MULTI-GRAPHICS PROCESSOR SYSTEM, GRAPHICS PROCESSOR AND DATA TRANSFER METHOD

(75) Inventors: Nobuo Sasaki, Kanagawa (JP); Masao Shimizu, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1697 days.

(21) Appl. No.: 11/805,165

(22) Filed: May 22, 2007

(65) Prior Publication Data

US 2007/0273699 A1    Nov. 29, 2007

(30) Foreign Application Priority Data

May 24, 2006  (JP) ................................. 2006-144501

(51) Int. Cl.  
*G06F 15/16*  (2006.01)  
*G09G 5/399*  (2006.01)  
*G09G 5/36*  (2006.01)

(52) U.S. Cl.  
USPC ............................ 345/503; 345/539; 345/558

(58) Field of Classification Search  
USPC .......................... 345/501–503, 530, 539, 558  
See application file for complete search history.

(56) References Cited

U.S. PATENT DOCUMENTS

| 6,078,336 | A  | * | 6/2000 | Reynolds ....................... 345/558 |
| 6,339,427 | B1 | * | 1/2002 | Laksono et al. .............. 345/553 |
| 6,557,065 | B1 | * | 4/2003 | Peleg et al. .................... 710/300 |
| 6,707,457 | B1 | * | 3/2004 | Bates ............................ 345/503 |
| 6,734,862 | B1 | * | 5/2004 | Chapple et al. ............... 345/520 |
| 6,985,152 | B2 | * | 1/2006 | Rubinstein et al. ........... 345/520 |

FOREIGN PATENT DOCUMENTS

| JP | 60 27976   | 2/1985  |
| JP | 63-240663  | 10/1988 |
| JP | 1 269150   | 10/1989 |

* cited by examiner

*Primary Examiner* — Joni Richer  
(74) *Attorney, Agent, or Firm* — Frommer Lawrence & Haug LLP; William S. Frommer; Paul A. Levy

(57) ABSTRACT

A multi-graphics processor system includes a CPU; a first GPU connected to the CPU via an input/output interface; and a second GPU connected to the first GPU via a second-GPU interface. The first GPU is provided with a second-GPU bus for communicating the CPU and the second GPU via the second-GPU interface. The CPU communicates with the second GPU via the second-GPU bus after receiving a signal indicating the timing of the data communication.

10 Claims, 16 Drawing Sheets

MULTI-GRAPHICS PROCESSOR SYSTEM, GRAPHICS PROCESSOR AND DATA TRANSFER METHOD

BACKGROUND OF THE INVENTION

1. Field of the Invention

The present invention relates to a multiprocessor system, and more particularly to a multi-graphics processor system, a graphics processor, and a data transfer method for computing rendering data.

2. Description of the Related Art

High-resolution graphics are widely utilized in personal computers and video game machines. There are, for example, various applications, such as games and simulations which use high-quality 3D-computer graphics, and play video content including a combination of live action and computer graphics.

The rendering quality relies on the performance of graphics chips which are provided in the personal computers or video game machines. Accordingly, graphics chip manufacturers focus on the development of next-generation graphics chips that have improved performance, and the competition between different graphics chips is becoming increasingly fierce. Such advanced graphics are implemented with a mix of hardware and software, rather than with hardware technology alone. It is important to make effective use of the high-performance rendering function of the graphics chip using software technology to increase the rendering quality.

In the fierce competition to develop graphics chips, graphics chips having advanced rendering functions are continually being developed to provide expandability and extendibility for prospective graphics systems. Furthermore, graphics chips need to have flexibility, including compatibility with legacy programming languages and support for various video output formats and protocols, while still ensuring the expandability of the graphics system.

A multi-graphics processor system equipped with multiple graphics chips, which is connected to a central processing unit (CPU), is sometimes used to provide flexibility and extendibility. The CPU in the multi-graphics processor system exchanges data with the multiple graphics chips, and it is therefore important to increase the efficiency of data communication between them in order to improve the processing performance of the system.

Many general-purpose processors allow out-of-order command execution. In other words, multiple commands that are independent from each other are not executed in the order of the given program codes but in a more efficient order. Conversely, some graphics processors are designed using in-order command architecture and have no support for out-of-order execution. If data are exchanged between a general-purpose processor and a graphics processor which are connected to each other via an I/O interface, the differences in command execution schemes must be accommodated without sacrificing data transfer efficiency.

SUMMARY OF THE INVENTION

The present invention has been made in view of the aforementioned problems, and it is a general purpose of the present invention to provide a flexible multi-graphics processor system adaptable to various environments and thereby to increase the efficiency of rendering. Another general purpose of the present invention is to increase the efficiency of data transfer between processors which are connected to each other via an input/output interface.

In order to solve the aforementioned problems, a multiprocessor system according to one embodiment of the present invention includes: a general-purpose processor unit capable of processing commands either out of order or in order; a dedicated processor unit which processes commands in order; and an interface unit which connects the general-purpose processor unit and the dedicated processor unit so that the processors communicate with each other. The interface unit includes a FIFO (First In, First Out) queue in which data are queued in the order of issue of write commands. The write commands are issued in order to the dedicated processor unit by the general-purpose processor unit, and the queued data are to be written by the write commands. The data queued in the FIFO queue are then sent, in FIFO order, to the dedicated processor unit. The interface unit also includes a double buffer in which data are buffered in double-buffering mode. The data stored in the double buffer have been read from the dedicated processor unit in response to read commands. The read commands are issued out of order to the dedicated processor unit by the general-purpose processor unit. The data stored in the double buffer are then read out of order by the general-purpose processor unit. The general-purpose processor unit is provided with an intermediate buffer for exchanging data with the interface unit. Upon reception of an acknowledge signal notifying that the write command issued in order has been buffered in the intermediate buffer, the general-purpose processor unit may transfer the data to be written by the write commands to the intermediate buffer.

Another embodiment of the present invention relates to a multi-graphics processor system. The multi-graphics processor system includes: a main processor; a first graphics processor which is connected to the main processor via an input/output interface; a second graphics processor which is connected to the first graphics processor via an external connection interface; and a relay interface provided in the first graphics processor, which is used when the main processor communicates with the second graphics processor via the external connection interface. The main processor is operable to communicate with the second graphics processor via the relay interface in the first graphics processor, after receiving a signal indicating the timing of data communication.

This embodiment can prevent requests for data communication by the main processor from remaining in the buffer of the first graphics processor, thereby burdening the internal bus.

The relay interface in the first graphics processor may include a write buffer to be used when the main processor writes data to the second graphics processor. In this configuration, if there is an available space in the write buffer, a buffer-space notification signal is sent to the main processor, and the main processor then writes data in the write buffer after receiving the buffer-space notification signal.

The relay interface in the first graphics processor may include a read buffer to be used when the main processor reads data from the second graphics processor. In this configuration, when the read buffer fills up, a buffer-full notification signal may be sent to the main processor, and the main processor then reads the data stored in the read buffer after receiving the buffer-full notification signal.

The second graphics processor may be an embedded memory processor chip, in which a processor core and a video memory are integrated on a single chip. This configuration enables the second graphics processor to access the memory at high speed, thereby allowing high-speed processing with frequent reading from and writing to the memory. The processing result is then sent to the first graphics processor.

The first graphics processor may include a processor core which is connected to a frame buffer via a bus. This configuration allows the first graphics processor to receive rendering data from the second graphics processor, to temporarily store the data in such a high-capacity frame buffer, and then to perform rendering processing on rendering data stored in an external memory.

Still another embodiment of the present invention also relates to a multi-graphics processor system. The multi-graphics processor system includes: a first graphics processor which is connected to a main processor via an input/output interface; a second graphics processor which is connected to the first graphics processor via an external connection interface; and a relay interface provided in the first graphics processor, which is used when the main processor communicates with the second graphics processor via the external connection interface. The relay interface is configured to send a signal indicating the timing of data communication to the main processor, before the main processor starts to communicate with the second graphics processor via the relay interface provided in the first graphics processor.

Still another embodiment of the present invention relates to a graphics processor. The graphics processor includes: an input/output interface via which the graphics processor is connected to a main processor; an external connection interface via which the graphics processor is connected to another graphics processor; and a relay interface which is used when the main processor communicates with said another graphics processor via the external connection interface. The relay interface is configured to send a signal indicating the timing of data communication to the main processor, before the main processor starts to communicate with the other graphics processor via the relay interface provided in the first graphics processor.

Still another embodiment of the present invention relates to a data transfer method. The data transfer method is performed in a multiprocessor system in which a general-purpose processor unit and a dedicated processor unit are connected so as to communicate with each other, and includes: queuing data to be written by write commands in the order of issue of the write commands, in a FIFO queue, the write commands being issued in order to the dedicated processor unit by the general-purpose processor unit; sending the queued data in FIFO order to the dedicated processor unit; temporarily storing data read from the dedicated processor unit by read commands in a double buffer, the read commands being issued out of order to the dedicated processor unit by the general-purpose processor unit; and reading the data stored in the double buffer, out of order, by the general-purpose processor unit.

Still another embodiment of the present invention also relates to a data transfer method. The data transfer method is performed in a multi-graphics processor system in which a first graphics processor is connected to an input/output interface in a main processor and a second graphics processor is connected to an external connection interface in the first graphics processor. The data transfer method includes: communicating between the main processor and the second graphics processor via a relay interface after the main processor receives a signal indicating the timing of data communication from a buffer for data communication, the relay interface and the buffer being provided in the first graphics processor.

Arbitrary combinations of the aforementioned constituting elements, and implementations of the invention in the form of methods, processors, apparatuses, systems, computer programs, program products, and data structures may also be practiced as additional embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

First Embodiment

A first embodiment shows a multiprocessor system, in which a general-purpose processor and a graphics processor are connected to each other via an input/output interface, and a mechanism for data transfer when the general-purpose processor issues read and write commands to the graphics processor.

The configuration of a general-purpose processor system 500 is described with reference to FIGS. 1 and 2. Processing flows for issuance of write commands from the general-purpose processor system 500 to a target device 710a or 710b (hereinafter collectively or individually referred to as target device 710) are described with reference to FIGS. 3A to 3D. Processing flows for issuance of read commands from the general-purpose processor system 500 to a target device 710 are described with reference to FIGS. 4A to 4C. A mechanism that accommodates differences in command execution schemes in an interface connecting the general-purpose processor system 500 and a graphics processing unit (GPU) 700 is described with reference to FIGS. 5 to 7.

Figure 1:
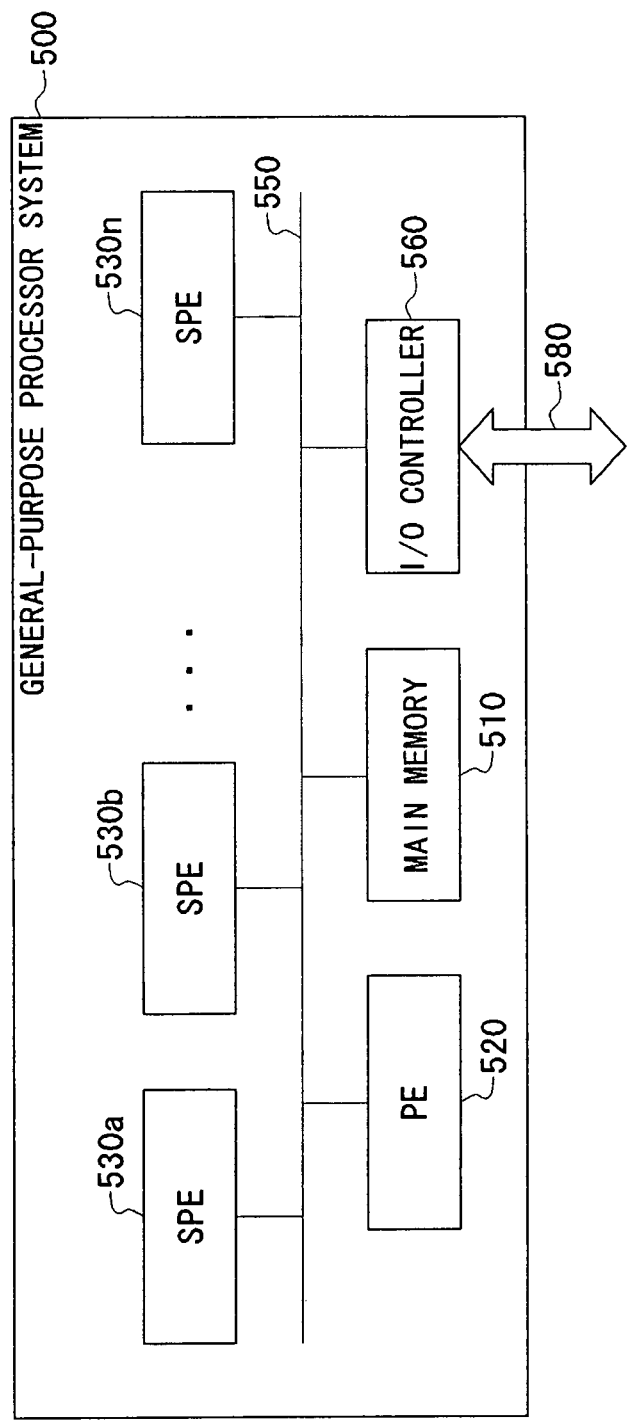
FIG. 1 is a block diagram of a general-purpose processor system according to a first embodiment.

FIG. 1 is a block diagram of the general-purpose processor system 500 according to the first embodiment. The general-purpose processor system 500 is a multiprocessor system and includes a single processing element (PE) 520; multiple sub-processing elements (SPEs) 530a, 530b, . . . , 530n (hereinafter collectively or individually referred to as SPE 530); a main memory 510; an I/O controller 560; and a bus 550 by which these components are connected to each other. The general-purpose processor system 500 may be a multi-core processor system, which is provided as a single package integrating many components.

The PE 520 centrally controls the whole general-purpose processor system 500. The multiple SPEs 530 operate asynchronously. The general-purpose processor system 500 is connectable to an external device via an input/output interface (hereinafter referred to as "IOIF") 580. The I/O controller 560 controls reading and writing data among the PE 520, SPE 530, and the external device.

Figure 2:
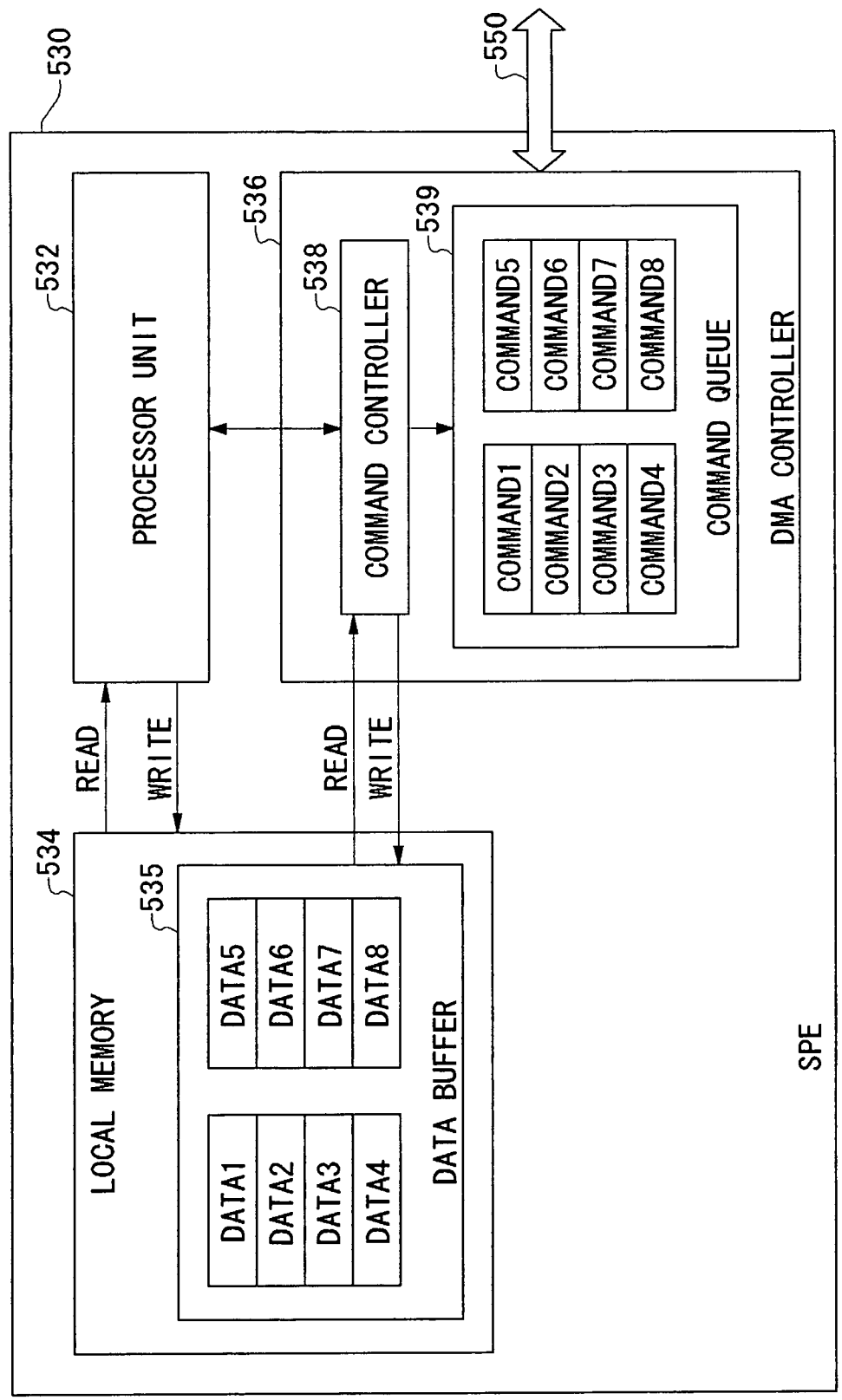
FIG. 2 is a block diagram of one of sub-processing elements shown in FIG. 1.

FIG. 2 is a block diagram of the SPE 530. The SPE 530 includes a processor unit 532, a local memory 534, and a DMA controller 536. The processor unit 532 issues dynamic memory access (DMA) commands to the DMA controller 536. A command controller 538 of the DMA controller 536 divides a DMA command, which is received from the processor unit 532, into 128-byte transfer command to be transmitted on a bus, and then queues the 128-byte transfer commands in a command queue 539.

The data that are subject to DMA transfer are stored in a data buffer 535 provided in the local memory 534, which is included in the SPE 530. The command controller 538 issues a write command to the external device. Upon receiving an ACK signal, being a write enable signal, in response to the write command, the command controller 538 accesses the local memory 534 to read data to be written and then performs DMA transfer on the read data. The command controller 538 also stores, in the data buffer 535 of the local memory 534, data which have been subject to DMA transfer by a read command from the external device.

Referring to FIG. 2, eight commands, command 1 to command 8, are stored as transfer commands in the command queue 539, and eight pieces of data, data 1 to data 8, to be transferred according to command 1 to command 8 respectively are stored in the data buffer 535. These commands are, in practice, read commands or write commands.

The command controller 538 includes an execution mode changer which changes between out-of-order execution mode and in-order execution mode. Changing the execution mode is performed by writing a value indicating either the out-of-order execution mode or in-order execution mode in a register. In the out-of-order execution mode, data are transferred in a more efficient order independent of the order of issue of commands. In the in-order execution mode, data are transferred in the order of issue of commands.

The IOIF 580, which connects the general-purpose processor system 500 and the external device, has two channels, an upstream channel and a downstream channel, and provides high bandwidth, e.g., several tens of gigabytes per second, comparable to a memory bus. In order to implement simultaneous data transfer by the multiple SPEs 530 that operate asynchronously, the maximum size of a data packet on the bus is as small as 128 bytes. Therefore, a packet occupies the bus for just a short time.

Within the short occupation time, however, it is impossible to complete, for example, write command process: sending an address command from the SPE 530, sending back an ACK signal from the external device, sending data from the SPE 530, and receiving the data in the external device. Accordingly, the general-purpose processor system 500 implements a split transaction in which a plurality of address command packets and data packets are simultaneously transferred. The address command packet and data packet are hereinafter simply referred to as COMMAND and DATA, respectively.

The basic process of the split transaction will now be described with reference to FIGS. 3A to 3D and FIGS. 4A to 4C. In practice, the data transfer is complicated because the actual system includes an internal buffer comprising the IOIF 580 or the like as described later. However, for simplicity, the data transfer process between the general-purpose processor system and the target device 710 will be described below without considering the internal buffer.

Figure 3A:
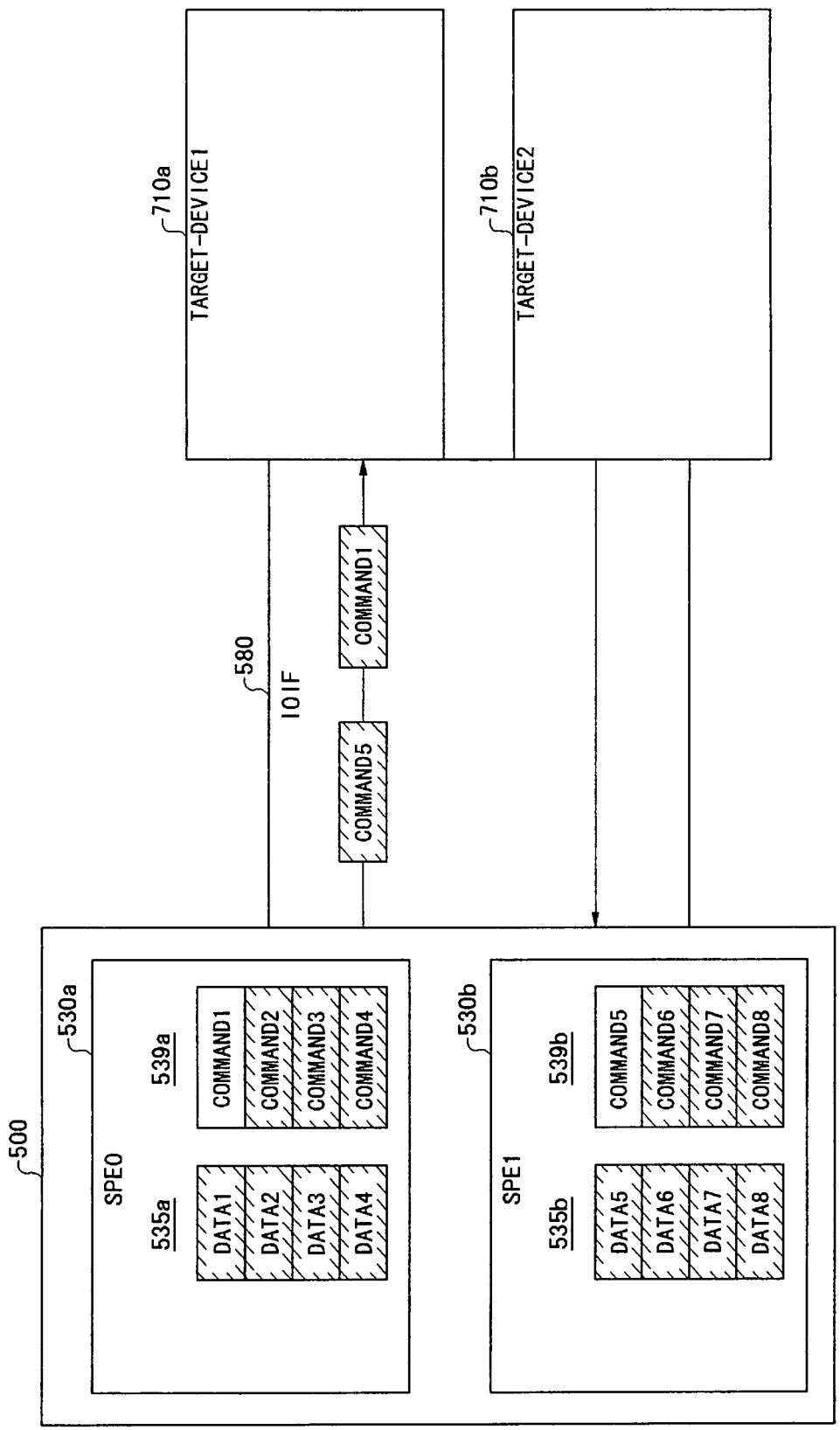
FIGS. 3A to 3D illustrate the process for executing write commands in a split transaction.
Figure 3B:
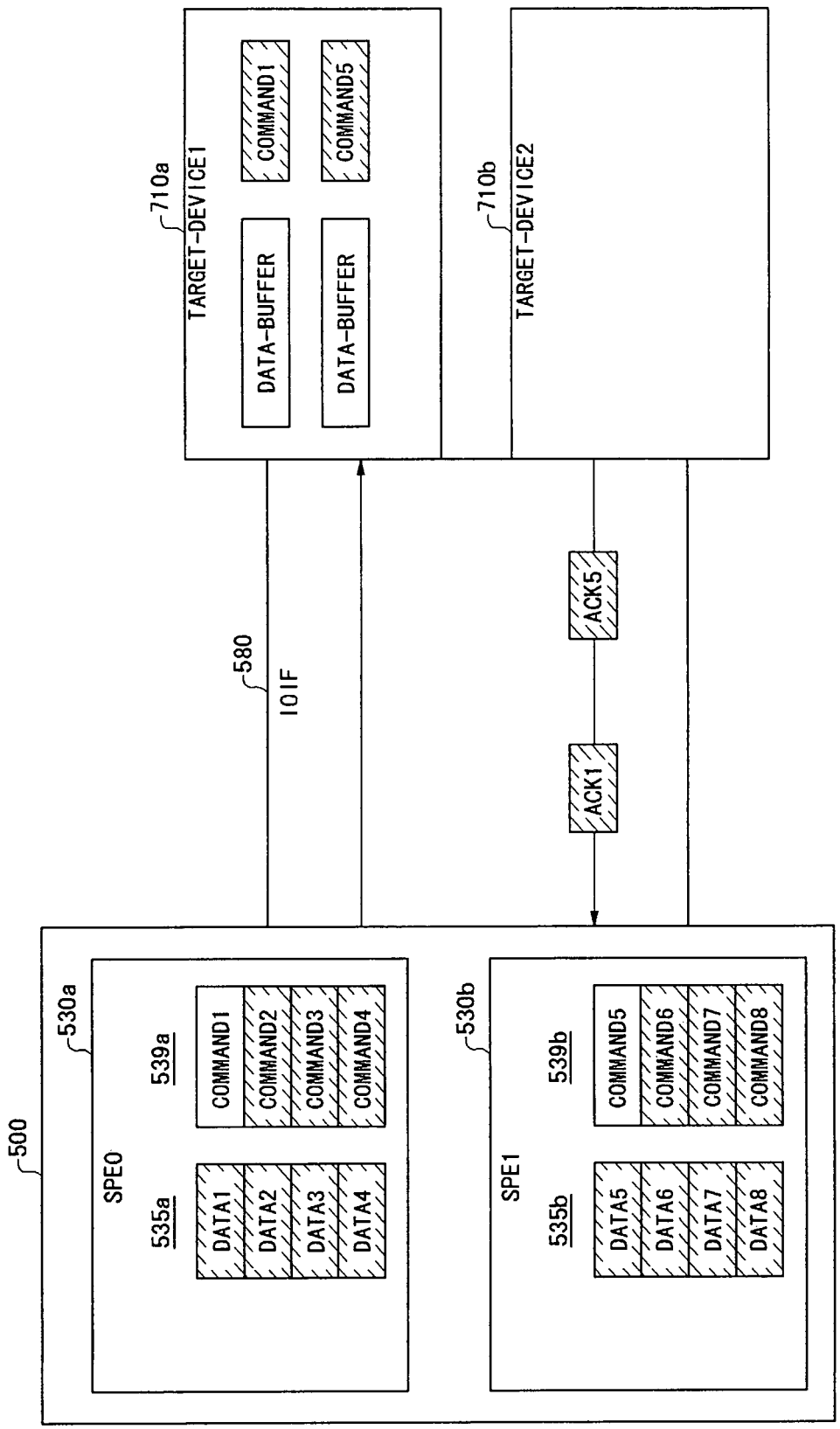
Figure 3C:
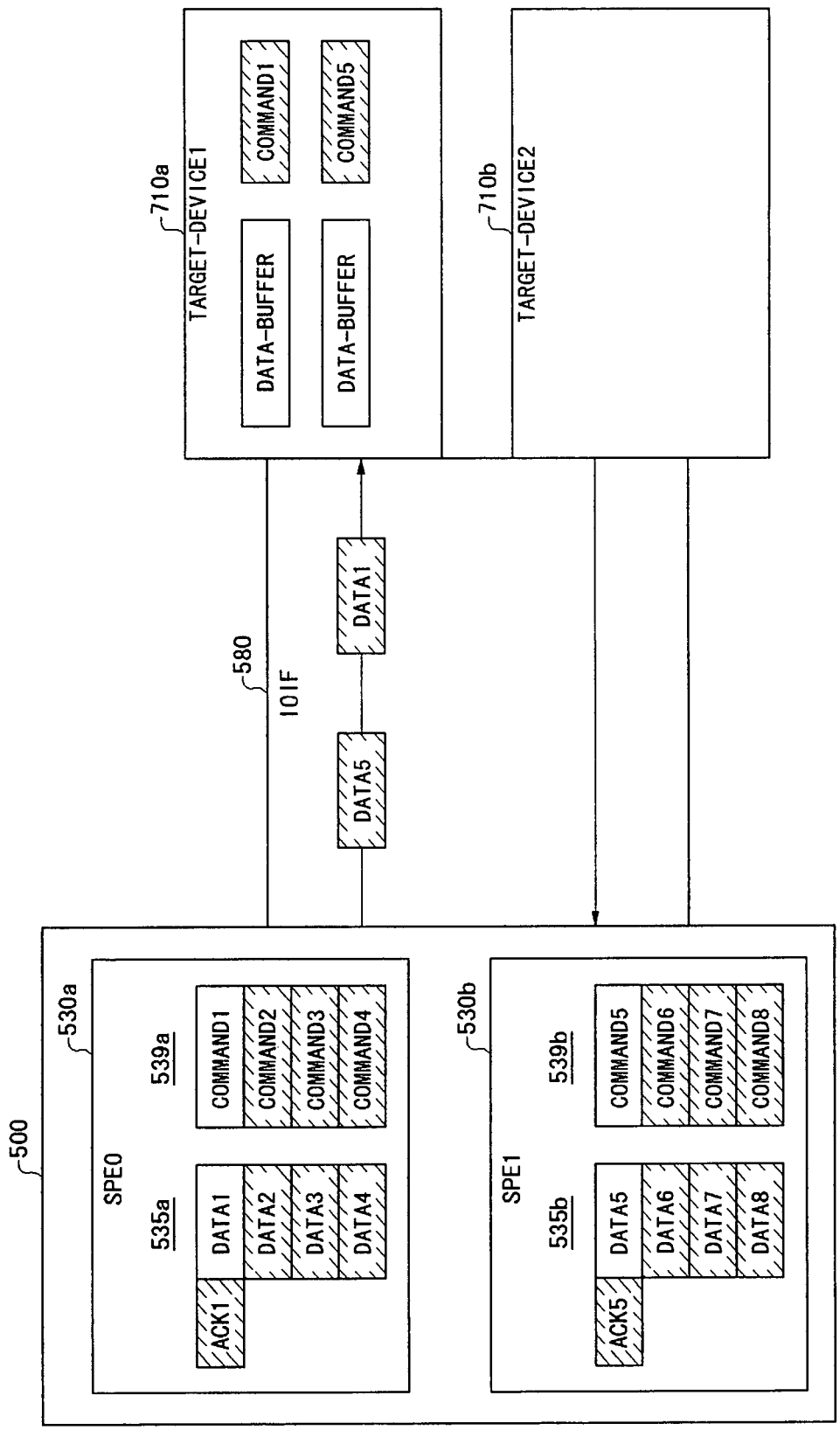

FIGS. 3A to 3C illustrate the process for executing write commands in the split transaction. Suppose that the general-purpose processor system 500 includes two SPEs 530a, 530b each issuing write commands. Four commands, COMMAND1 to COMMAND4, are queued in a command queue 539a of the first SPE 530a, and four pieces of data, DATA1 to DATA4, to be transferred according to the commands respectively, are stored in a data buffer 535a. Four other commands, COMMAND5 to COMMAND8, are queued in a command queue 539b of the second SPE 530b, and four pieces of data, DATA5 to DATA8, to be transferred according to those commands respectively, are stored in a data buffer 535b. Each COMMAND is a write command and includes an address for data to be written. The first SPE 530a and the second SPE 530b are hereinafter referred to as SPE0 and SPE1, respectively.

The two target devices 710a and 710b are connected to the general-purpose processor system 500 via the IOIF 580. The first target device 710a and the second target device 710b are hereinafter referred to as TARGET-DEVICE1 and TARGET-DEVICE2, respectively. The COMMANDs sent by the general-purpose processor system 500 arrive at one of TARGET DEVICE 1 and 2 according to the address included in the COMMANDs.

As shown in FIG. 3A, COMMAND1 is sent to the IOIF 580 from the head of the command queue 539a of SPE0, and COMMAND5 is sent to the IOIF 580 from the head of the command queue 539b of SPE1. COMMAND1 and COMMAND5 both include an address for TARGET-DEVICE1, and thus are sent to a command buffer of TARGET-DEVICE1.

As shown in FIG. 3B, COMMAND1 and COMMAND5 are then stored in the command buffer of TARGET-DEVICE1. The command buffer of TARGET-DEVICE1 has spaces as required for storing DATA sent according to each COMMAND. TARGET-DEVICE1 sends back ACK1 in response to COMMAND1 and ACK5 in response to COMMAND5, to the general-purpose processor system 500 via the IOIF 580.

As shown in FIG. 3C, when receiving ACK1 from TARGET-DEVICE1, SPE0 reads DATA1 corresponding to COMMAND1 from the data buffer 535a and sends it to the IOIF 580. When receiving ACK5 from TARGET-DEVICE1, SPE1 reads DATA5 corresponding to COMMAND5 from the data buffer 535b and sends it to the IOIF 580. DATA1 and DATA5 sent to the IOIF 580 are then stored in the data buffer of TARGET-DEVICE1.

Figure 3D:
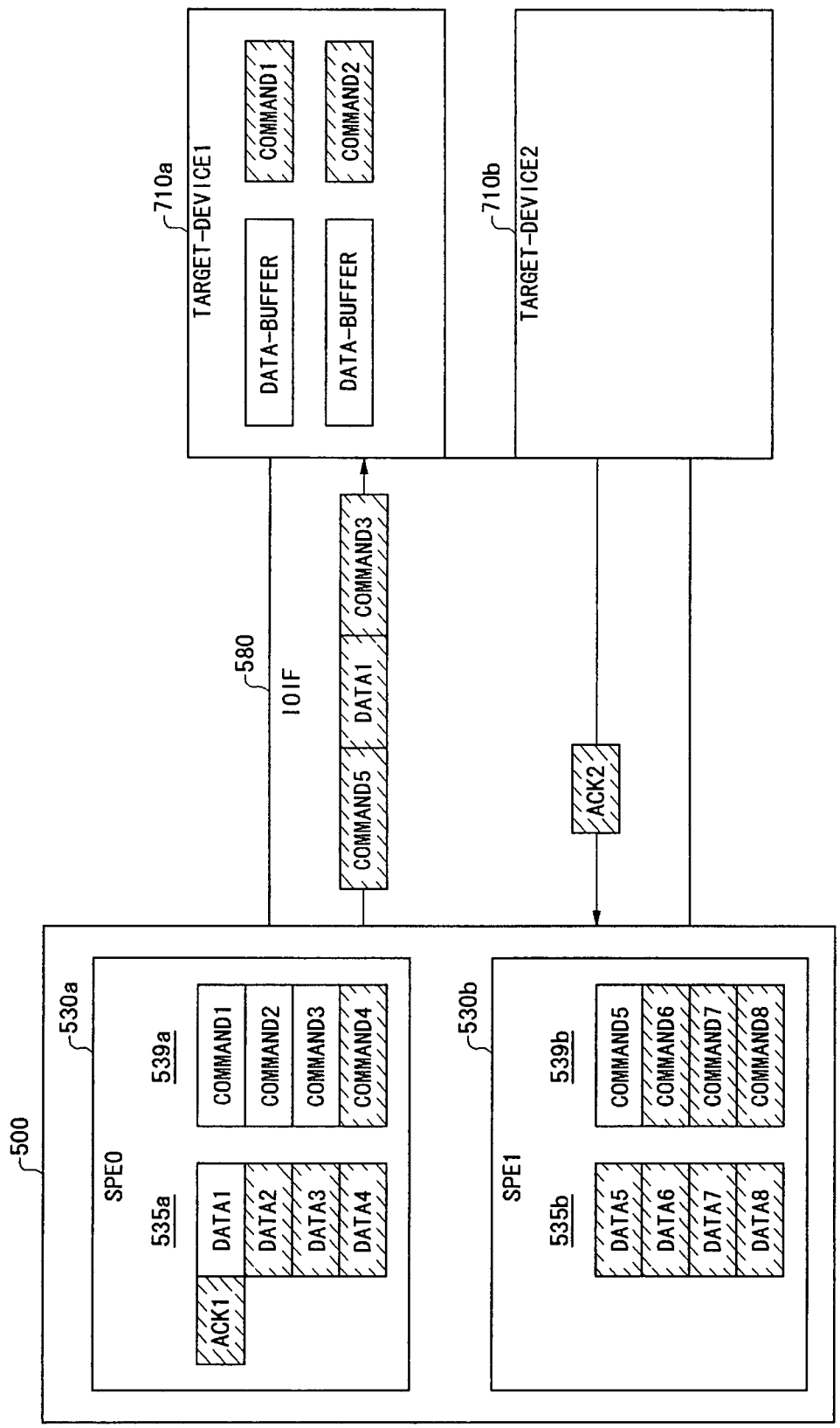

The advantage of the split transaction will be described with reference to FIG. 3D. Suppose that COMMAND 1 and COMMAND 2 have been sent from the command queue 539a of SPE0 and thus arrived at the command buffer of TARGET-DEVICE1. SPE0 has then sent COMMAND3 from the command queue 539a to the IOIF 580. TARGET-DEVICE1 has also finished sending ACK1 for COMMAND1 to SPE0. SPE0 which has received ACK1 is just sending DATA1 corresponding to COMMAND1 to the IOIF 580.

Here, suppose that TARGET-DEVICE1 has not sent back ACK2 as soon as it has received COMMAND2 because the data buffer has had no space. In this situation, COMMAND5 will be sent from the command queue 529b of SPE1 without waiting for ACK2 for COMMAND2, which is issued by SPE0. TARGET-DEVICE1 will then send back ACK2 for COMMAND2 because there is a space in the data buffer.

As described above, with the multiple SPEs 530 performing data transfer while sharing the IOIF 580 in the split transaction, an SPE which is waiting for ACK does not prevent other SPEs from performing data transfer. The multiple SPEs 530, which operate asynchronously, can write data to the multiple target devices 710 by executing commands while sharing the bandwidth of the IOIF 580. This makes the most of the bandwidth of the IOIF 580, thereby allowing increased efficiency of data transfer.

Figure 4A:
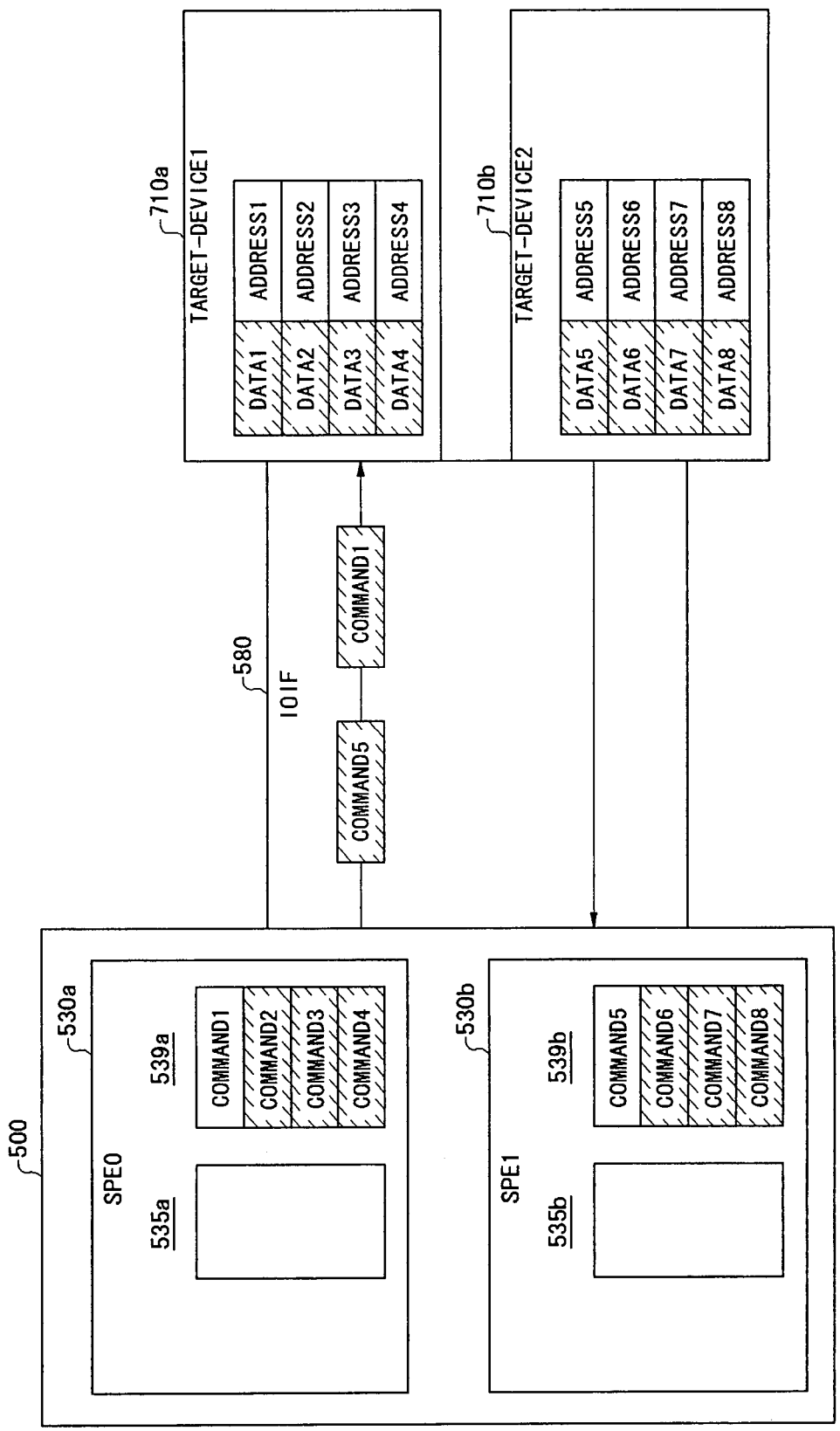
FIGS. 4A to 4C illustrate the process for executing read commands in the split transaction.
Figure 4B:
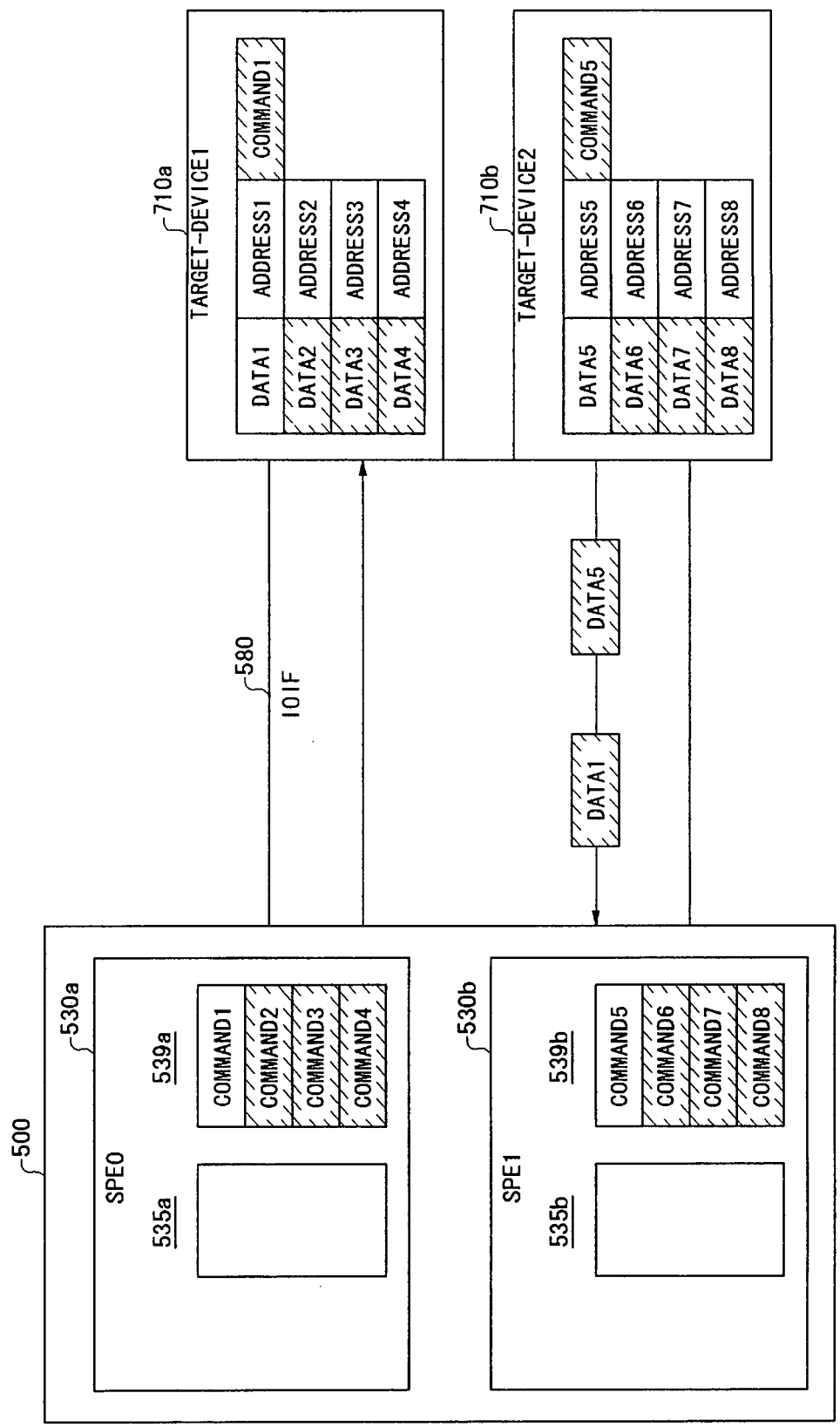
Figure 4C:
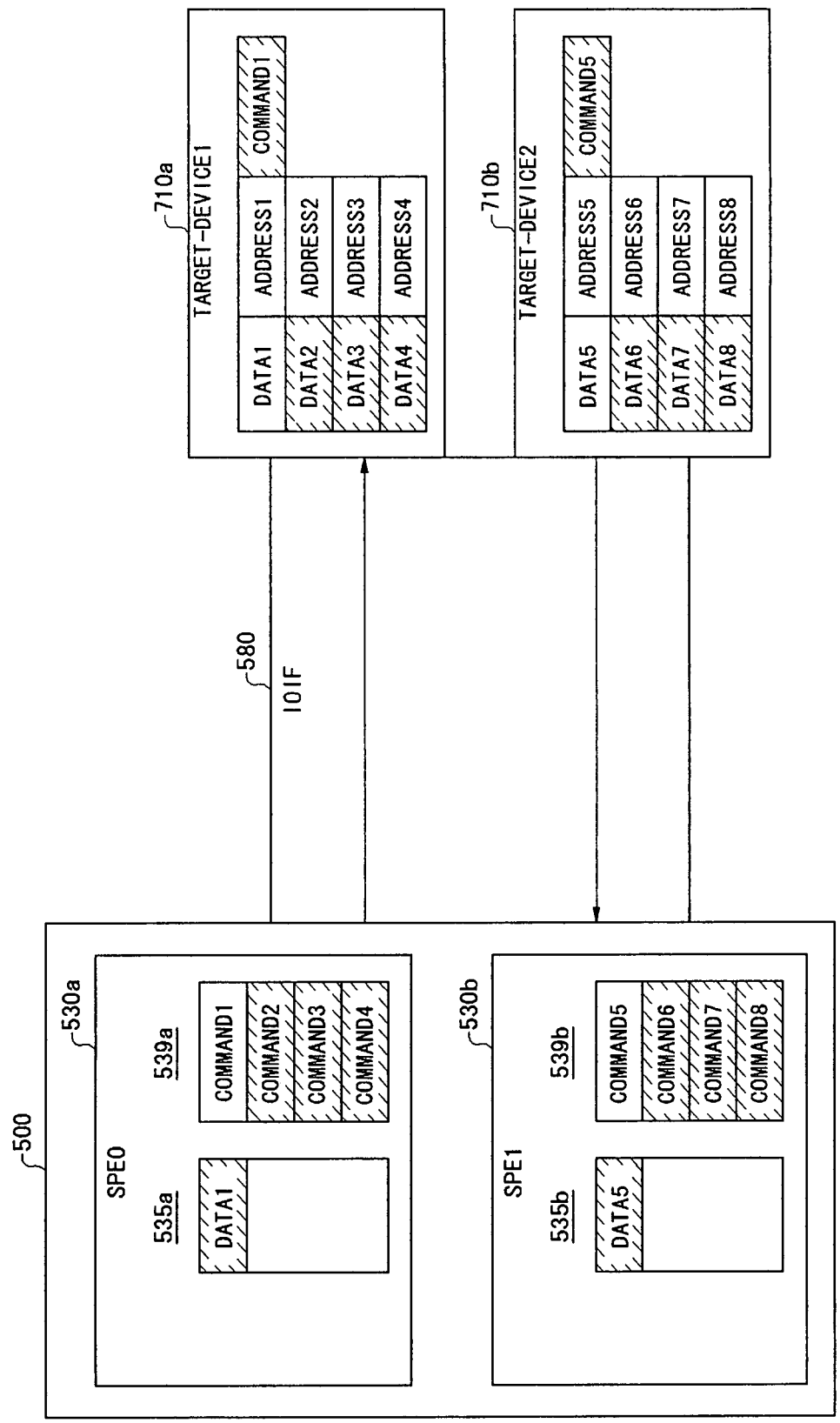

FIGS. 4A to 4C illustrate the process for executing read commands in the split transaction. COMMAND1 to COMMAND4 are queued in the command queue 539a of SPE0, while the data buffer 535a, which stores the transferred data, is empty. COMMAND5 to COMMAND8 are queued in the command queue 539b of SPE1, while the data buffer 535b, which stores the transferred data, is empty. Each COMMAND is a read command and includes an address for data to be read from.

As shown in FIG. 4A, COMMAND1 is sent to the IOIF 580 from the head of the command queue 539a of SPE0, and COMMAND5 is sent to the IOIF 580 from the head of the command queue 539b of SPE1. COMMAND1 includes ADDRESS1 which is the address for TARGET-DEVICE1 and thus is sent to the command buffer of TARGET-DEVICE1. COMMAND5 includes ADDRESS5 which is the address for TARGET-DEVICE2 and thus is sent to a command buffer of TARGET-DEVICE2.

As shown in FIG. 4B, COMMAND1 is stored in the command buffer of TARGET-DEVICE1, and thus TARGET-DEVICE1 reads DATA1 specified by ADDRESS1 included in COMMAND1 and sends it to the IOIF 580. COMMAND5 is stored in the command buffer of TARGET-DEVICE2, and thus TARGET-DEVICE2 reads DATA5 specified by ADDRESS5 included in COMMAND5 and sends it to the IOIF 580.

As shown in FIG. 4C, SPE0 then receives DATA1 from TARGET-DEVICE1 and stores it in the data buffer 535a, and SPE1 then receives DATA5 from TARGET-DEVICE2 and stores it in the data buffer 535b.

As with the write commands, the split transaction allows an SPE to execute a read command even while other SPEs wait for data required by other read commands.

The IOIF 580 supports data transfer between multiple requesters (e.g., SPE0 and SPE1) and multiple target devices (e.g., TARGET-DEVICE1 and TARGET-DEVICE2) within the mechanism of the split transaction. For example, a communication between SPE0 and TARGET-DEVICE2 and a communication between SPE1 and TARGET-DEVICE1 can be performed simultaneously in parallel. The split transaction ensures that when performing simultaneous communications by multiple communication pairs in parallel, data communication by one communication pair is not blocked even when another communication pair is disrupted due to a fault.

The write commands and read commands are each divided into packet unit suitable for the bandwidth of the bus prior to their execution. In order to increase the efficiency of data transfer, an out-of-order communication is needed. The mechanism of the out-of-order communication is that the target device which has received a command packet can transfer command packets one after another, independently of the order of issue of the command packets, as soon as the data to be transferred is ready. The IOIF 580 supports this out-of-order communication.

The out-of-order communication is useful for simultaneous communication among multiple requesters and multiple target devices. However, many existing target devices use architecture for in-order command execution, and therefore require COMMAND and DATA to be transferred in order. If data transfer is performed between a requester and a target device which requires in-order command execution, an interface between the requester and the target device must include a buffer for accommodating the differences in command execution schemes.

A mechanism is described hereafter that increases the data transfer efficiency while accommodating the differences between command execution schemes in a multiprocessor system in which a general-purpose processor unit capable of both out-of-order execution and in-order execution and a graphics processor unit capable only of in-order execution are connected to each other.

Figure 5:
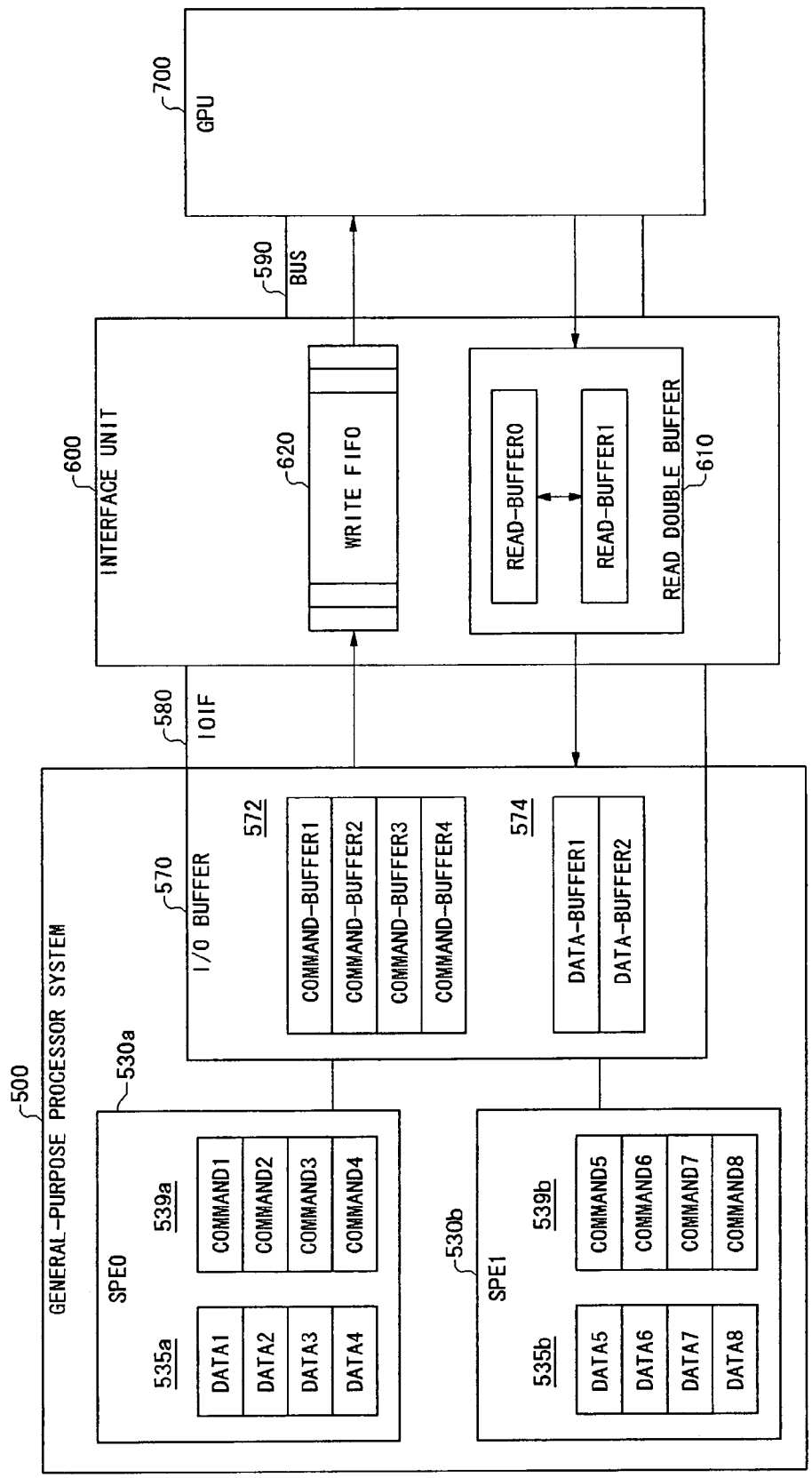
FIG. 5 is a block diagram of a multiprocessor system in which a general-purpose processor system and a graphics processing unit are connected via an input/output interface.

FIG. 5 is a block diagram of a multiprocessor system in which the general-purpose processor system 500 and a graphics processing unit 700 (GPU) are connected via the IOIF 580. The general-purpose processor system 500 can select either out-of-order execution mode or in-order execution mode as the command execution mode. On the other hand, the GPU 700 allows only in-order execution and thus requires the general-purpose processor system 500 to transfer commands to the GPU 700 in order.

The general-purpose processor system 500 includes an I/O buffer 570 for sending and receiving data to and from the IOIF 580. The I/O buffer 570 includes a command buffer 572 which stores commands issued from each SPE 530, and a data buffer 574 which stores data sent to and received from the GPU 700.

An interface unit 600 is provided between the general-purpose processor system 500 and the GPU 700 and includes a buffer which relays data to be exchanged between them. The interface unit 600 serves to accommodate the differences between out-of-order execution and in-order execution. The general-purpose processor system 500 is connected to the interface unit 600 via the IOIF 580. The GPU 700 is connected to the interface unit 600 via a bus 590.

Each SPE 530 of the general-purpose processor system 500 basically uses the out-of-order execution mode but changes to the in-order execution mode when issuing write commands to the GPU 700. The command controller 538 of each SPE 530 issues commands using a mode called guarded transfer in order to switch from the out-of-order execution mode to the in-order execution mode.

The interface unit 600 includes a write FIFO 620 for buffering write commands and data to be written by the write commands in FIFO (First In First Out) order. The commands issued in order by each SPE 530 are temporarily stored in the command buffer 572 of the I/O buffer 570, queued in the order of issue in the write FIFO 620, and then sent in FIFO order to the GPU 700. The data to be written by the write commands are temporarily stored in the data buffer 574 of the I/O buffer 570, queued in the order of issue of the commands in the write FIFO 620, and then sent in FIFO order to the GPU 700.

Accordingly, the GPU 700 receives the write commands and data from the general-purpose processor system 500 in order, and then writes the write commands and data in order in the memory. In other words, the command sequence and the data sequence that are written in a memory area are the same in terms of order; the data sequence is not supplied in an order different to that of the command sequence.

Each SPE 530 performs out-of-order execution on read commands for the GPU 700, not in-order execution. The reason for the command execution mode differing between read commands and write commands when the general-purpose processor system 500 transfers commands to the GPU 700 will be discussed later.

The interface unit 600 includes a read double buffer 610 that buffers data which are pushed by the GPU 700 according to the read commands transferred from the general-purpose processor system 500. The read double buffer 610 has a double-buffer architecture which includes two read buffers, READ-BUFFER0 and READ-BUFFER1, whereby when one read buffer fills up, the other read buffer stores data. The GPU 700 processes the read commands in the in-order execution and then transfers the read data to READ-BUFFER0 or READ-BUFFER1 of the read double buffer 610.

The general-purpose processor system 500 reads the data out of order from either one of the read buffers of the read double buffer 610 that fills up, and stores them in the data buffer 574 of the I/O buffer 570. The data stored in the data buffer 574 are sent out of order to SPE0 or SPE1 which has issued the read command.

Figure 6:
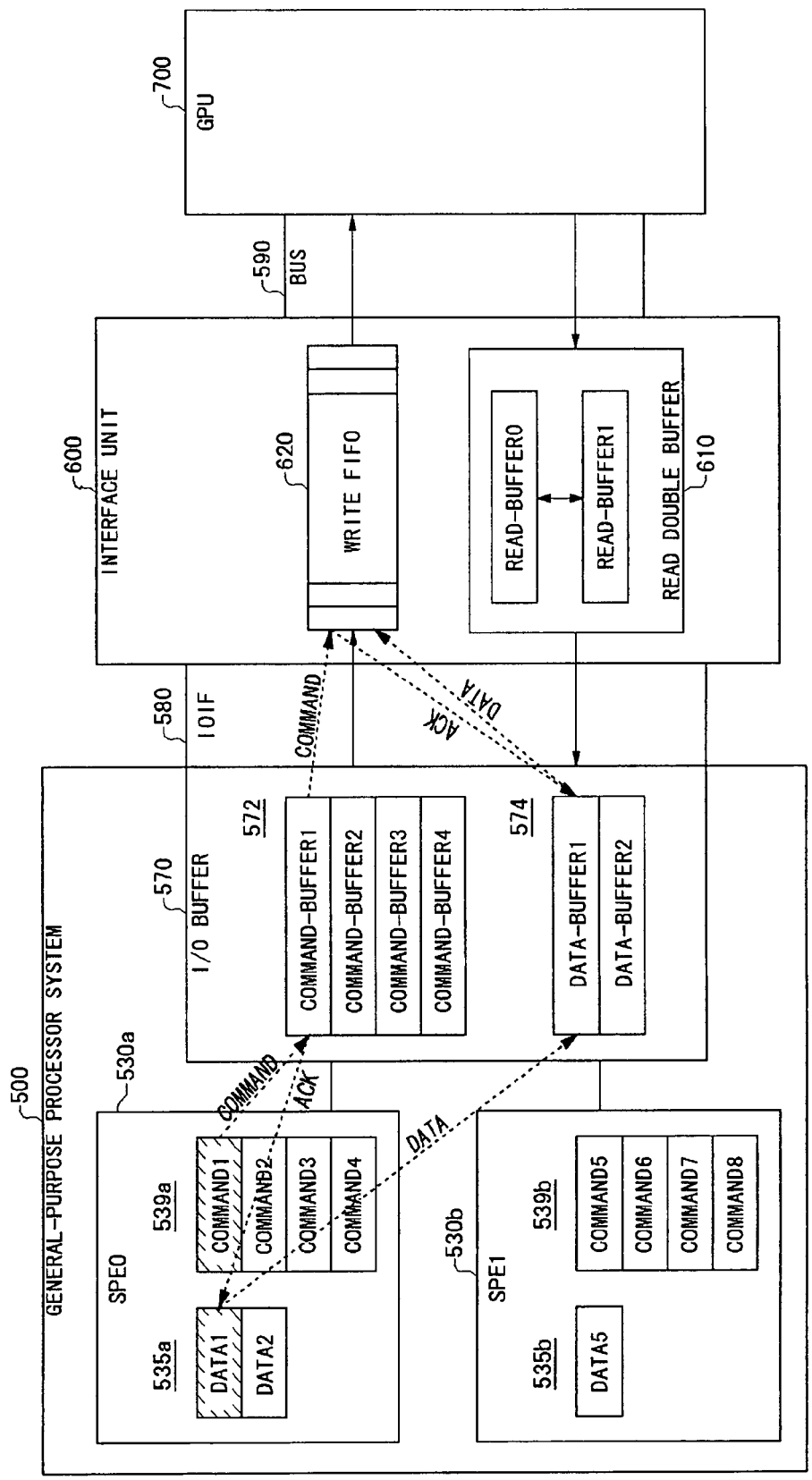
FIG. 6 illustrates the procedure for executing write commands in the configuration shown in FIG. 5.

FIG. 6 illustrates the procedure for executing write commands in the configuration shown in FIG. 5. When issuing write commands to the GPU 700, the general-purpose processor system 500 sets a memory-mapped memory area of GPU 700 as a guarded area and specifies a guarded attribute for write commands to perform data writing in in-order execution. The write commands are executed with the following procedure.

(A1) SPE0 obtains COMMAND1 from the command queue 539*a* and transfers COMMAND1 to the command buffer 572 of the I/O buffer 570.

(A2) ACK is returned in response to COMMAND1 from the I/O buffer 570 to SPE0.

(A3) When receiving ACK, SPE0 obtains DATA1 from the data buffer 535*a* and transfers it to the data buffer 574 of the I/O buffer 570.

(A4) SPE0 obtains COMMAND2 from the command queue 539*a* and transfers it to the command buffer 572 of the I/O buffer 570.

(A5) ACK is returned in response to COMMAND2 from the I/O buffer 570 to SPE0.

(A6) When receiving ACK, SPE0 obtains DATA2 from the data buffer 535*a* and transfers it to the data buffer 574 of the I/O buffer 570.

Since SPE0 executes the write commands in order, the sequence (A4) to (A6) for COMMAND2 is not started until the sequence for COMMAND1—(A1) issuance of command, (A2) return of ACK, and (A3) transfer of data—is completed. More specifically, in in-order execution mode, the sequence (A4) to (A6) for COMMAND2 cannot start until ACK is returned from the I/O buffer 570 in response to DATA1 for COMMAND1 which is transferred at (A3). It should be noted that since the general-purpose processor system 500 implements the split transaction, the communication between SPE1 and the GPU 700 is independent from the communication between SPE0 and the GPU 700 and therefore the communication between SPE1 and the GPU 700 is not blocked even when the communication between SPE0 and the GPU 700 waits for ACK.

In parallel with the communication sequence (A1) to (A6)—transfer of command, return of ACK, and transfer of data between SPE0 and the I/O buffer 570—a communication sequence including transfer of command, return of ACK, and transfer of data between the I/O buffer 570 and the interface unit 600 is performed as follows.

(B1) The I/O buffer 570 obtains COMMAND1 from the command buffer 572 and transfers COMMAND1 to the write FIFO 620 of the interface unit 600.

(B2) ACK is returned in response to COMMAND1 from the write FIFO 620 to the I/O buffer 570.

(B3) When receiving ACK, the I/O buffer 570 obtains DATA1 from the data buffer 574 and transfers it to the write FIFO 620 of the interface unit.

As a result, the intermediate buffers of the I/O buffer 570 separates the communication (A1) to (A3) between SPE0 and the I/O buffer 570 from the communication (B1) to (B3) between the I/O buffer 570 and the interface unit 600. Accordingly, SPE0 can issue commands one after another, independently of the status of communication beyond the IOIF 580, thereby increasing the data transfer efficiency.

If the I/O buffer 570 has no intermediate buffer and an SPE 530 does not issue a subsequent command unless the interface unit 600 sends back ACK notifying that the issued command is stored in the write FIFO 620 of the interface unit 600, the issuance of the subsequent command is delayed due to the latency of the IOIF 580. The delayed issuance of commands causes reduced data transfer efficiency because the bandwidth of the IOIF 580 is not fully utilized. In the present embodiment, the time from command issuance to ACK reception is very short because the SPE 530 can receive ACK from the I/O buffer 570, which is close to the SPE 530, as soon as the write command is queued in the command buffer of the I/O buffer 570. Therefore, even if write commands are subject to in-order execution, the write commands can be issued one after another with very short latency. This allows efficient use of the bandwidth of the IOIF 580 without reducing data transfer efficiency.

Figure 7:
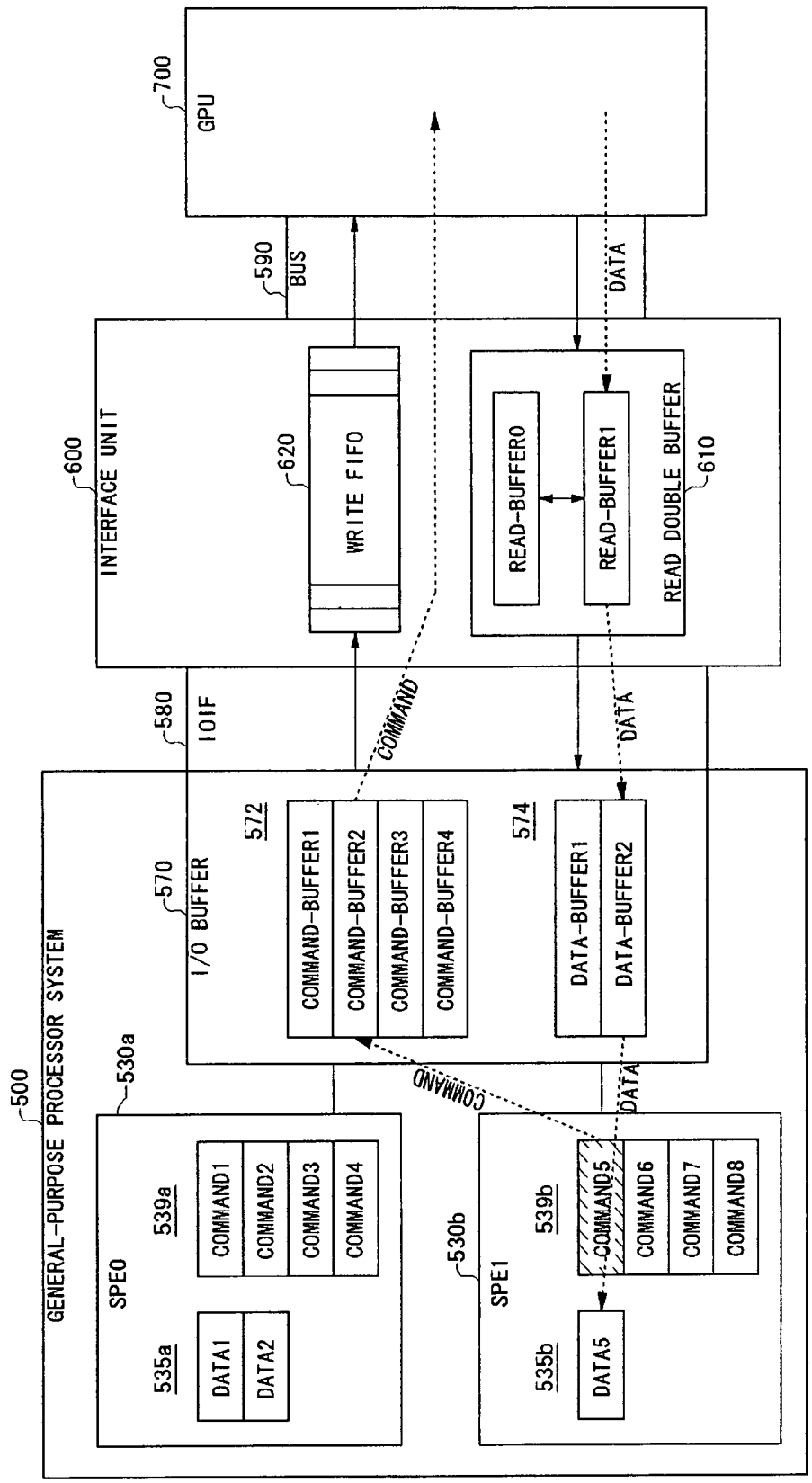
FIG. 7 illustrates the procedure for executing read commands in the configuration shown in FIG. 5.

FIG. 7 illustrates the procedure for executing read commands in the configuration shown in FIG. 5. The in-order execution of read commands will first be described for comparison, in order to reveal a problem resulting in reduced data transfer efficiency in the in-order execution. Thereafter, the manner in which out-of-order execution of read commands increases the data transfer efficiency will be described.

(C1) SPE1 obtains COMMAND5 from the command queue 539*a* and transfers COMMAND5 to the command buffer 572 of the I/O buffer 570.

(C2) COMMAND5 is then transferred from the I/O buffer 570 to the GPU 700 via the interface unit 600, and in response to COMMAND5, the GPU 700 transfers DATA5 to the read double buffer 610 of the interface unit 600.

(C3) DATA5 is transferred from the read double buffer 610 of the interface unit 600 to the data buffer 574 of the I/O buffer 570.

(C4) DATA5 is then transferred from the data buffer 574 of the I/O buffer 570 to the data buffer 535*b* of SPE1.

(C5) SPE1 obtains COMMAND6 from the command queue 539*a* and transfers COMMAND6 to the command buffer 572 of the I/O buffer 570.

(C6) COMMAND6 is then transferred from the I/O buffer 570 to the GPU 700 via the interface unit 600, and in response to COMMAND6, the GPU 700 transfers DATA6 to the read double buffer 610 of the interface unit 600.

(C7) DATA6 is transferred from the read double buffer 610 of the interface unit 600 to the data buffer 574 of the I/O buffer 570.

(C8) DATA6 is then transferred from the data buffer 574 of the I/O buffer 570 to the data buffer 535*b* of SPE1.

Since SPE1 executes the read commands in order, the sequence (C5) to (C8) for COMMAND6 is not started until the sequence for COMMAND5—(C1) transfer of command from SPE1 to the I/O buffer 570, (C2) transfer of command from the I/O buffer 570 to the GPU 700 via the interface unit 600 and transfer of data from the GPU 700 to the interface unit 600, (C3) transfer of data from the interface unit 600 to the I/O buffer 570, and (C4) transfer of data from the I/O buffer 570 to SPE1—is completed.

According to the in-order execution of read commands, unless the SPE 530 receives data in response to a read command issued by the SPE 530 itself, the SPE 530 cannot issue the next read command. The in-order execution of read commands, therefore, causes a delay in the issuance of read commands. The IOIF 580, which is an interface for connecting the SPE 530 and an external device, has a long latency from read command issuance to data reception and differs from memory access in this regard. Waiting for arrival of the prior read command causes the data transfer efficiency using the read commands to decrease considerably, and prevents efficient use of the high-speed bandwidth of the IOIF 580.

When receiving the read command from the general-purpose processor system 500, the GPU 700 transfers data in order to the read double buffer 610 of the interface unit 600. Each SPE 530 of the general-purpose processor system 500, however, processes the read commands out of order, and therefore does not always require reading of data in the order of issue of the read commands. Accordingly, when one read buffer of the read double buffer 610 fills up, the general-purpose processor system 500 reads the data out of order from the read buffer. In this way, if the data are read out of order from the read buffers, independently of the order of issue of the commands, each SPE 530 can issue the next read command without waiting for reception of data in response to the prior read command, thereby causing no delay in the issuance of read commands.

As described above, the multiprocessor system (in which the general-purpose processor system 500 is connected to the GPU 700 that requires in-order command execution) is configured to queue data in the order of issue of write commands in the FIFO queue and then to transfer the data in FIFO order to the GPU 700, when the write commands are transferred from the general-purpose processor system 500 to the GPU 700. The write commands are issued in order, and the FIFO queue is provided in the interface unit 600. According to the in-order execution, the next write command cannot be issued until an ACK signal is returned in response to the prior write command and the transfer of the data to be written is completed. However, since the ACK signal is received from the I/O buffer 570 which is an intermediate buffer close to the SPE 530, there is no long delay in the issuance of the write commands.

On the other hand, with the read commands, the interface unit 600 includes the double buffer, and when receiving the read command from the general-purpose processor system 500, the GPU 700 reads data in order by executing the read command and transfers the read data in order to the double buffer. The general-purpose processor system 500 which issues the read command out of order reads the data out of order from the double buffer and therefore can issue the read command without waiting for completion of data reading in response to the prior read command. This causes no delay in the issuance of read commands and allows increased data transfer efficiency.

Some other reasons for the interface unit 600 providing the FIFO queue for writing and the double buffer for reading are as follows.

The difference between the FIFO queue and double buffer is first described. The FIFO queue has higher space efficiency than the double buffer in terms of SRAM capacity and transfer bandwidth, both of which are required for buffering. Moreover, with the double buffer, no data are transferred from one buffer in normal operation unless that buffer fills up; with the FIFO queue, data are transferred in order of arrival.

The data to be transferred from the general-purpose processor system 500 to the GPU 700 includes, but are not limited to, rendering command and texture data, and frequently vary in size or transfer frequency. The FIFO queue is suitable for data which have irregular sizes or occurrence frequencies because it transfers the data as soon as they arrive.

On the other hand, most data to be transferred from the GPU 700 to the general-purpose processor system 500 are image rendering data, and thus their size and transfer frequency are fixed. Such regular data of constant size or occurrence frequency can be transferred efficiently even with the double buffer in which data transfer is started when a predetermined amount of data is buffered. Since the size of the regular data are determined at the start of transfer, the data stored in the buffer can be read depending on its size even if one buffer of the double buffer does not fill up by storing the data to be transferred. Moreover, reading the data out of order from the general-purpose processor system 500 requires a memory-mapped buffer rather than a FIFO queue.

According to the first embodiment, the GPU 700 is described as one example of the target device but alternatively the target device may be other processing unit which implements in-order command execution, such as a dedicated processing unit for communication processing, speech processing, or the like.

Second Embodiment

A second embodiment shows a multi-graphics processor system in which a general-purpose processor is connected to multi-graphics processors, and the system is based on the technology described in the first embodiment. If any one of the multi-graphics processors connected to the general-purpose processor supports only in-order memory access, an interface of such a graphics processor can be designed using the technology described in the first embodiment.

Figure 8:
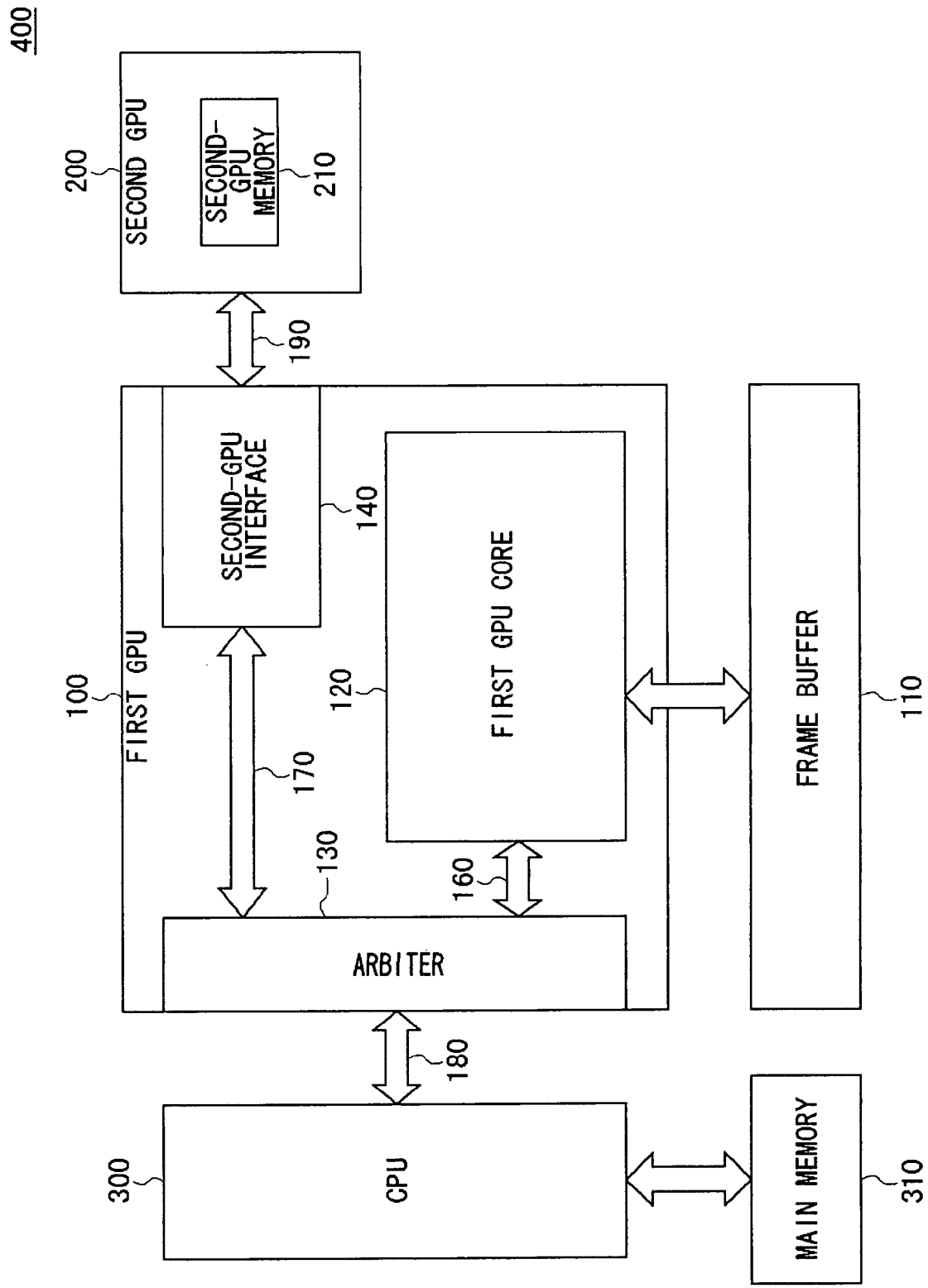
FIG. 8 is a block diagram of a multi-graphics processor system according to a second embodiment.

FIG. 8 is a block diagram of a multi-graphics processor system 400 according to the second embodiment. The multi-graphics processor system 400 includes a first GPU 100, a second GPU 200, a frame buffer 110, a central processing unit (CPU) 300, and a main memory 310.

The CPU 300 loads a program stored in the main memory 310, executes the program, and reads and writes data to and from the main memory 310. The CPU 300 also centrally controls the whole multi-graphics processor system 400.

The CPU 300 is described below as a single main processor but may be a multiprocessor system which includes multiple processors as shown in the first embodiment, or may be a multi-core processor which is provided as a single package integrating multiple processor cores. Note that in the multiprocessor system, the multiple processors operate asynchronously with each other.

Each of the first GPU 100 and the second GPU 200 is a graphics chip provided with a graphics processor core. Each of the first GPU 100 and the second GPU 200 may be the same graphics chip or may be a different graphics chip which provides different processing functions.

The first GPU 100 and the second GPU 200 may be mounted on a single board such as a graphics board or may be mounted on separate boards which are connected to each other via a connector. Alternatively, at least one of the first GPU 100 and the second GPU 200 may be mounted on a board such as a mother board together with the CPU 300.

The first GPU 100 is connected to the CPU 300 via an input/output interface 180. The I/O interface 180 allows data exchange between the first GPU 100 and the CPU 300. The I/O interface 180 also corresponds to the IOIF 580 shown in the first embodiment.

The first GPU 100 and the CPU 300 may perform processing in parallel or may perform processing sequentially between them. The data processed by the first GPU 100 may be sent to the CPU 300, and then the CPU 300 may perform further processing of the data. The data processed by the CPU 300 may be sent to the first GPU 100, and then the first GPU 100 may perform further processing of the data.

The first GPU 100 includes a first GPU core 120, an arbiter 130, and a second-GPU interface 140.

The first GPU core 120 is a graphics engine which has rendering functions and can read and write rendering data from and to the frame buffer 110 bus-connected to the first GPU core 120. The frame buffer 110 is a memory accessed by the first GPU core 120 and stores texture data, image rendering data, and the like. The first GPU core 120 has a terminal for outputting the rendering data, and the output data are sent to a display on which the data are displayed as 3D graphics.

The arbiter 130 distributes the data received from the CPU 300 to the second-GPU interface 140 and the first GPU core 120 according to the address included in the data, while storing the data in a buffer not shown in the figure. A second-GPU bus 170 is an internal bus for exchanging control signals and data between the arbiter 130 and the second-GPU interface 140. A first-GPU bus 160 is an internal bus for exchanging control signals and data between the arbiter 130 and the first GPU core 120.

The second-GPU interface 140 is connected to the second GPU 200 which is external to the first GPU 100, and is a relay interface for exchanging data between the CPU 300 and the second GPU 200 by converting the data received from the CPU 300 into interface protocols for the second GPU 200 and vice versa. The first GPU 100 and the second GPU 200 are connected to each other via a second GPU connection bus 190.

The data to be sent from the CPU 300 to the second GPU 200 are supplied to the second-GPU interface 140 of the first GPU 100, and sent by the second-GPU interface 140 to the second GPU 200 via the second GPU connection bus 190.

The CPU 300 may send the data read from the main memory 310 to the second GPU 200 via the second-GPU interface 140, or may read the data which have been subject to rendering computing processing by the first GPU core 120, from the frame buffer 110, and send the read data to the second GPU 200 via the second-GPU interface 140. In the latter case, the second GPU 200 can perform further rendering computing processing on the rendering result by the first GPU core 120.

The data to be sent from the second GPU 200 to the CPU 300 are supplied to the second-GPU interface 140 of the first GPU 100 via the second GPU connection bus 190, and transferred by the second-GPU interface 140 to the CPU 300. The CPU 300 may obtain from the second GPU 200 the rendering data originally stored in a second-GPU memory 210 and then send the rendering data to the first GPU core 120 via the first-GPU bus 160. This allows the first GPU core 120 to perform further rendering computing processing on the rendering result of the second GPU 200, and allows the frame buffer 110 to store the processing result.

Figure 9:
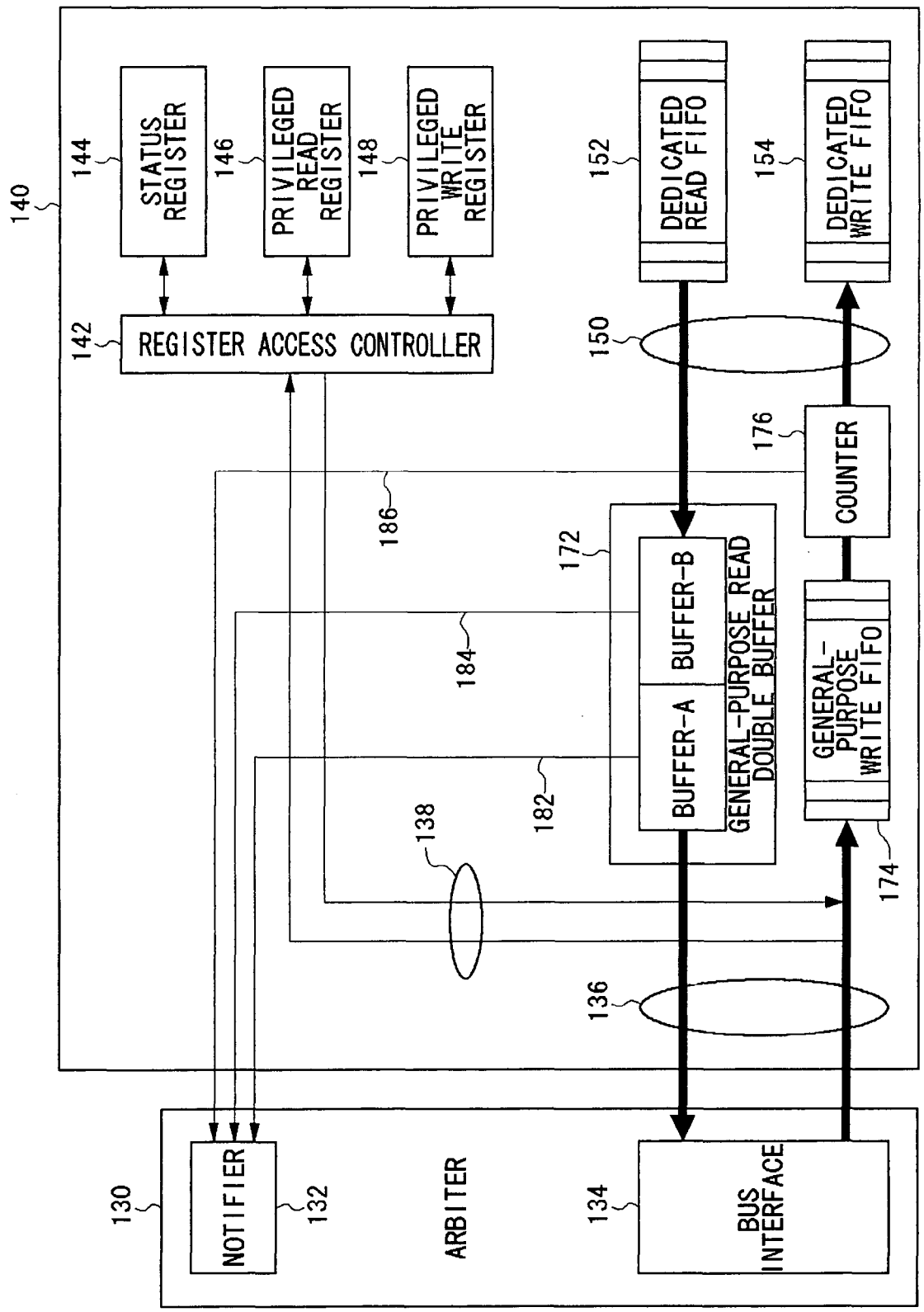
FIG. 9 illustrates a detailed configuration of an arbiter and an interface for a second GPU shown in FIG. 8.

FIG. 9 illustrates a detailed configuration of the arbiter 130 and the second-GPU interface 140. Specifically, FIG. 9 shows a configuration in which the arbiter 130 has distributed data to the CPU 300 and the first GPU core 120 and is just processing the data exchanged between the CPU 300 and the second-GPU interface 140.

The arbiter 130 includes a notifier 132 and a bus interface 134. The second-GPU interface 140 includes a general-purpose read double buffer 172, a general-purpose write FIFO 174, a counter 176, a register access controller 142, a status register 144, a privileged read register 146, a privileged write register 148, and a dedicated read FIFO 152, and a dedicated write FIFO 154.

The general-purpose read double buffer 172, the general-purpose write FIFO 174, and the counter 176 are each buffers which are provided in a bridge area between a data bus 136 of the arbiter 130 and a data bus 150 of the second-GPU interface 140, and serve to adjust the timing of exchanging data between the CPU 300 and the second GPU 200.

The bus interface 134 of the arbiter 130 is an interface for writing the data received from the CPU 300 into the general-purpose write FIFO 174 via the data bus 136 and for sending the data read from the general-purpose double buffer 172 via the data bus 136 to the CPU.

The notifier 132 receives a specific signal when the general-purpose read double buffer 172 fills up, and then notifies the CPU 300 that the general-purpose read double buffer 172 has filled up in order to request the CPU 300 to read the data. The notifier 132 also receives a specific signal when there is a space in the general-purpose write FIFO 174, and then notifies the CPU 300 that the general-purpose write FIFO 174 has that space in order to request the CPU 300 to write the data.

The communication between the CPU 300 and the second GPU 200 includes, but not limited to, an access command for accessing the privileged read register 146 or the privileged write register 148 to read or write in the control register of the second GPU 200, packet data of a rendering command sent to the second GPU 200, and rendering data read from the second-GPU memory 210 of the second GPU 200.

Handshake information for communication between the second GPU 200 and the CPU 300 is transmitted from the second GPU 200 to the CPU 300 through the notifier 132. The CPU 300 performs data communication based on the handshake information under software control. The CPU 300 has a dedicated register for receiving the notification from the notifier 132. The notifier 132 can send a notification signal to the CPU 300 by writing in the dedicated register.

The status register 144 holds a status of the second-GPU interface 140. The privileged read register 146 is a register for reading the status of the control register of the second GPU 200. The privileged write register 148 is a register for writing in the control register of the second GPU 200. The register access controller 142 receives a request for access to the registers from the bus interface 134 of the arbiter 130 via the register access bus 138, and reads and writes values from and to the registers in response to the request.

The dedicated read FIFO 152 and the dedicated write FIFO 154 are FIFO buffers provided in the second-GPU interface 104 to accommodate the difference in frequency between the second GPU 200 and the second-GPU interface 140, and are 256 bytes as one example.

The general purpose read double buffer 172 is a buffer for reading the data which are subject to rendering computing processing by the second GPU 200 and which are stored in the second-GPU memory 210. The general purpose read double buffer 172 includes two buffers, BUFFER-A, BUFFER-B. As one example, BUFFER-A and BUFFER-B are each 2-kilobyte SRAM. The data read from the second-GPU memory 210 are stored in FIFO order in the dedicated read FIFO 152 of the second-GPU interface 140, and are sequentially written alternately in BUFFER-A and BUFFER-B via the data bus 150. When BUFFER-A or BUFFER-B fills up, signals 182, 184 for notifying that the buffer has filled up (hereinafter, referred to as "buffer-full notification signals") are sent to the notifier 132.

The general-purpose write FIFO 174 is a FIFO buffer for sending data from the CPU 300 to the second GPU 200, and is 8-kilobyte FIFO memory as one example. The data queued in the general purpose write FIFO 174 are sequentially read out, and are then written in the dedicated write FIFO 154 via the data bus 150. When there is a space available in the general-purpose write FIFO 174, a signal 186 for notifying that the general-purpose write FIFO 174 has that space (hereinafter, referred to as "buffer-space notification signal") is sent to the notifier 132.

The counter 176 counts the amount of data read out from the general-purpose write FIFO 174, and notifies the notifier 132 with a signal indicating the current queue space of the general-purpose write FIFO 174. As one example, the counter 176 is an N*128-byte counter. The N*128-byte counter counts the amount of transmitted data in 128-byte units, issues a specific signal when the amount reaches N*128 bytes, and then resets the count value. For N=32, the counter 176 issues the specific signal and resets the count value with every 4 kilobytes of data read.

Here, in response to a read command issued by the CPU 300, the data are transferred in order to the general-purpose read double buffer 172 by the second GPU 200. When BUFFER-A or BUFFER-B of the general-purpose read double buffer 172 fills up and the CPU 300 accordingly receives the buffer-full notification signals 182 and 184, the CPU 300 reads the data out of order from the buffer of the general-purpose read double buffer 172.

The write commands issued by the CPU 300 and the data to be written are queued in order in the general-purpose write FIFO 174, and are then transferred in order to the second GPU 200.

The second-GPU interface 140 is provided with the general-purpose read double buffer 172 and the general-purpose write FIFO 174 for the same reason as the interface unit 600 as shown in the first embodiment being provided with the read double buffer 610 and the write FIFO 620. The CPU 300, therefore, can accommodate the differences in command execution schemes by transferring commands and data in order to the second GPU 200 which implements that in-order execution. As described in the first embodiment, the CPU 300 receives ACK for write commands from the buffer of the input/output interface which is close to the CPU 300 in order to prevent processing efficiency from being reduced by the in-order execution. The CPU 300 also reads the data in response to the read command out of order from the general-purpose read double buffer 172. Accordingly, with the multi-graphics processor system 400 in which the second GPU 200 requiring in-order execution is connected to the first GPU 100, the CPU 300 can efficiently perform graphics processing in cooperation with the first GPU 100 and the second GPU 200 without reducing the data transfer efficiency.

The communication procedure between the CPU 300 and the second GPU 200 in the multi-graphics processor system 400 will be described below with reference to flowcharts of FIGS. 10 and 11.

Figure 10:
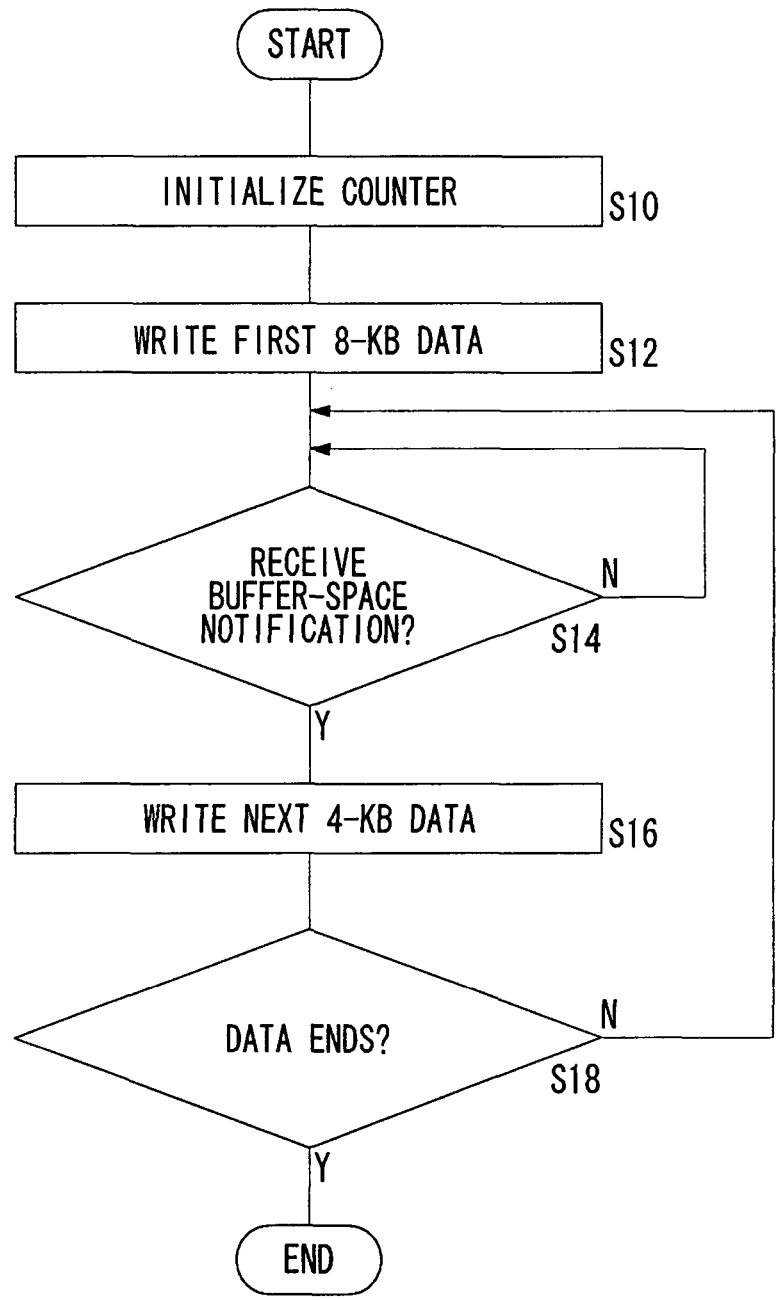
FIG. 10 is a flowchart showing a packet transfer procedure when a CPU shown in FIG. 8 writes data to the second GPU.

FIG. 10 is the flowchart showing a packet transfer procedure when the CPU 300 writes data to the second GPU 200.

The counter 176 is first initialized (S10). Suppose that the general-purpose write FIFO 174 has a capacity of 8 kilobytes and the counter 176 is the N*128-byte counter (N=32). Accordingly, with every 4 kilobytes of data transferred from the general-purpose write FIFO 174 to the dedicated write FIFO 154 of the second-GPU interface 140, the buffer-space notification signal for notifying that there is a space available in the buffer is sent from the counter 176 to the CPU 300 through the notifier 132.

The CPU 300 writes the first 8 kilobytes of data in the general-purpose write FIFO 174 (S12), and then waits for the buffer-space notification signal sent from the counter 176 (N at S14).

When receiving the buffer-space notification signal from the counter 176 (Y at S14), the CPU 300 transfers the next 4 kilobytes of data to the general-purpose write FIFO 174 (S16).

When the end of the data to be transferred is reached (Y at S18), the CPU 300 finishes the packet transfer. When data still remain to be transferred (N at S18), the CPU 300 waits for the next buffer-space notification signal to continue the packet transfer by returning to step S14.

As described above, the CPU 300 does not transfer the next packet to the general-purpose write FIFO 174 unless there is a space available in the general-purpose write FIFO 174. The advantage of such a data transfer procedure is as follows.

If the CPU 300 transfers the data so that the general-purpose write FIFO 174 always fills up, the transfer data not queued in the general-purpose write FIFO 174 will be queued in the buffer of the arbiter 130, eventually overflowing the buffer of the arbiter 130. The data to be transferred to the first GPU core 120 are also queued in the buffer of the arbiter 130, thereby causing a conflict with the data to be transferred to the second GPU 200. This results in blocking of data transfer to the first GPU core 120. Therefore, transferring data from the CPU 300 only when there is a space in the general-purpose write FIFO 174 prevents transfer data from remaining in the buffer of the arbiter 130, thereby causing no delay in data transfer to the first GPU core 120.

Figure 11:
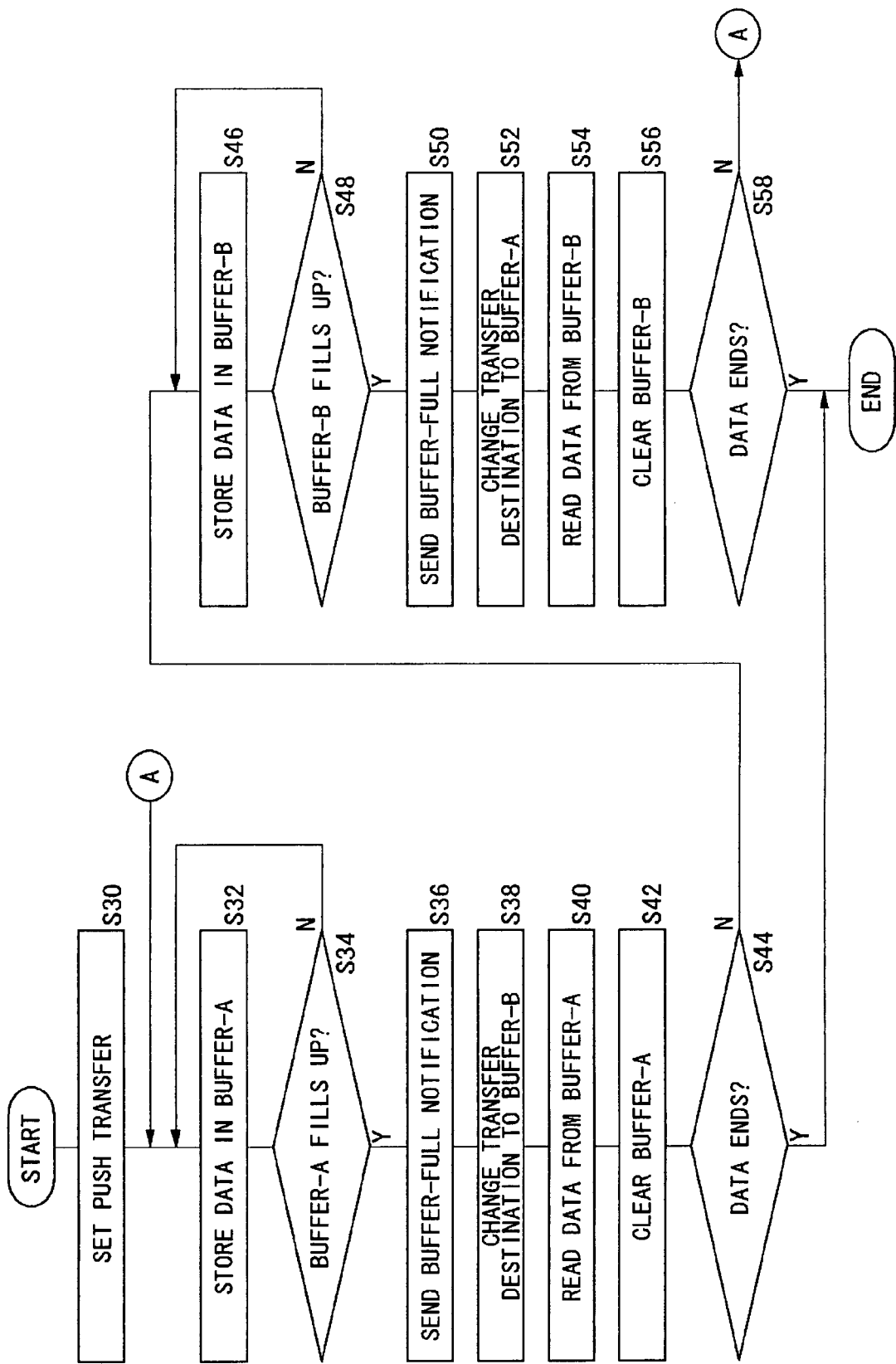
FIG. 11 is a flowchart showing a packet transfer procedure when the CPU shown in FIG. 8 reads data from the second-GPU memory of the second GPU.

FIG. 11 is the flowchart showing a packet transfer procedure when the CPU 300 reads data from the second-GPU memory 210 of the second GPU 200.

When the CPU 300 reads the data from the second-GPU memory 210 of the second GPU 200, the second GPU 200 serves as a master to push the data to the CPU 300. The second-GPU interface 140 performs setting for starting the push transfer (S30).

The data pushed by the second GPU 200 are stored in BUFFER-A of the general-purpose read double buffer 172 (hereinafter, simply referred to as "double buffer 172") (S32). If BUFFER-A of the double buffer 172 does not fill up (N at S34), further data are pushed into BUFFER-A by returning to step S32.

When BUFFER-A of the double buffer 172 fills up (Y at S34), the buffer-full notification signal for notifying that the buffer has filled up is sent to the CPU 300 through the notifier 132 (S36). In the double buffer 172, then, the buffer into which the data are to be pushed is changed from BUFFER-A to BUFFER-B (S38).

The CPU 300 confirms by the buffer-full notification signal received from the notifier 132 that BUFFER-A of the double buffer 172 has filled up, and then reads the data stored in BUFFER-A (S40).

When the CPU 300 finishes reading the data stored in BUFFER-A of the double buffer 172, BUFFER-A is cleared (S42). Note that 'clearing BUFFER-A' is not used to mean deleting the data in BUFFER-A, but setting a flag for invalidating the data in BUFFER-A.

When the end of the data to be transferred is reached (Y at S44), the CPU 300 finishes the packet transfer. When data still remain to be transferred (N at S44), step S46 is performed.

The data pushed by the second GPU 200 are stored in BUFFER-B of the double buffer 172 (S46). If BUFFER-B of the double buffer 172 does not fill up (N at S48), further data are pushed into BUFFER-B by returning to step S46. When BUFFER-B of the double buffer 172 fills up (Y at S48), the buffer-full notification signal is sent to the CPU 300 through the notifier 132 (S50). In the double buffer 172, then, the buffer into which the data are to be pushed is changed from BUFFER-B to BUFFER-A (S52).

The CPU 300 confirms by the buffer-full notification signal received from the notifier 132 that BUFFER-B of the double buffer 172 has filled up, and then reads the data stored in BUFFER-B (S54). When the CPU 300 finishes reading the data stored in BUFFER-B of the double buffer 172, BUFFER-B is cleared (S56).

When the end of the data to be transferred is reached (Y at S58), the CPU 300 finishes the packet transfer. When data still remain to be transferred (N at S58), the data push transfer is repeated while alternating BUFFER-A and BUFFER-B by returning to step S32.

As described above, after BUFFER-A or BUFFER-B of the double buffer 172 fills up, the CPU 300 collectively reads the data from the double buffer 172. The advantage of such a data transfer procedure is as follows.

If the CPU 300 issues a read command before the double buffer 172 fills up, the CPU 300 will wait until the buffer fills with data, so that read commands will remain in the buffer of the arbiter 130. The read commands for reading data from the first GPU core 120 are also queued in the buffer of the arbiter 130, thereby causing a conflict with the read commands for reading data from the second GPU 200. This results in a delay in execution of read commands for the first GPU core 120. Therefore, reading data from the CPU 300 after the double buffer 172 fills with data allows the read commands to be executed immediately without waiting for data, thereby preventing the data from remaining in the buffer of the arbiter 130.

The above description is an explanation of the configuration of the multi-graphics processor system 400 and the data transfer procedure. Described below are operational advantages due to the configuration in which the general-purpose read double buffer 172 and the general-purpose write FIFO 174 are provided and the timing of reading and writing data is notified with a signal to the second GPU 200 for data communication between the CPU 300 and the second GPU 200.

The second GPU 200 is externally connected to the first GPU 100. In other words, the second GPU 200 is an external device far away from the CPU 300 beyond the first GPU 100 connected to the south bridge. Accordingly, the CPU 300 cannot directly communicate with the second GPU 200, thereby causing a long latency of the communication between the CPU 300 and the second GPU 200. It is inefficient to obtain a status of the second GPU 200 by polling the register of the second GPU 200 by the CPU 300. Therefore, in order to increase the data transfer efficiency, the timing of reading and writing data is notified to the CPU 300 by sending a signal from the second GPU 200 to the CPU 300. This prevents read commands and write commands from remaining in the buffers of the arbiter 130 and the I/O interface 180, allowing the data communication between the CPU 300 and the first GPU core 120 to proceed smoothly.

In particular, with the I/O interface 180, which is a high-speed interface with a wide bandwidth, this embodiment provides a further advantage if the latency of data transfer is longer than the bandwidth. When the CPU 300 tries to confirm the status of data reading and writing of the second GPU 200 through the first GPU 100, it takes a long time to start reading or writing data because of the long latency of the I/O interface 180. Therefore, as with the embodiment, it is efficient to notify the CPU 300 of the timing of reading and writing data from the second GPU 200 and then to collectively read or write the data via the high-speed I/O interface 180 in response to a notification signal in the CPU 300.

The arbiter 130 allows parallel execution of the data transfer between the CPU 300 and the second GPU 200 and the data transfer between the CPU 300 and the first GPU core 120. Accordingly, a screen rendered by the second GPU 200 can be superimposed on a high-definition display screen rendered by the first GPU core 120. Moreover, the first GPU core 120 can perform image processing on a screen rendered by the second GPU 200 and output the resultant screen.

The above description is an explanation based on the embodiments. The embodiments are only illustrative in nature and it will be obvious to those skilled in the art that variations in constituting elements and processes are possible within the scope of the present invention. Some variations are described below.

The first GPU 100 and the second GPU 200 may differ in processing performance or function, and divide their responsibilities. The second GPU 200 is an embedded DRAM graphics chip as one example. The embedded DRAM graphics chip is a single semiconductor chip on which a DRAM and logic circuits are integrated. The DRAM mounted on the chip has a limited capacity but its memory bandwidth is wider than the bandwidth possible with a discrete chip. Accordingly, if the DRAM mounted on the chip is used as a video memory, the second GPU 200 can read and write data from and to the video memory at high speed. For example, it is suitable for rendering processing which frequently reads and writes data from and to the video memory, such as overwriting textures.

Conversely, the first GPU 100, which is connected to the large-capacity frame buffer 110 via the bus, can use a large-capacity memory while having a small memory bandwidth. The first GPU 100 is, therefore, suitable for memory-consuming processing. Moreover, the first GPU 100 is suitable for rendering processing which requires computation power rather than memory access, such as a shader program.

The first GPU 100 and the second GPU 200 can divide their responsibilities using the difference in memory configuration therebetween. For example, the first GPU 100 performs pixel shading which requires heavy computation such as complex light reflection computation and shading processing, while the second GPU 200 performs rendering processing which frequently reads and writes data from and to the memory, such as rasterizing, texture mapping, motion blur, and alpha blending.

In order to make the second GPU 200 perform processing which requires a wide memory bandwidth, the first GPU 100 sends the intermediate result of processing to the second GPU 200, and then the second GPU 200 performs intensive memory-accessing processing and sends back only the processing result to the first GPU 100. Accordingly, the interface between the first GPU 100 and the second GPU 200 can have a narrow bandwidth.

The first GPU 100 and the second GPU 200 may have different graphics processing functions. For example, one graphics chip may include a geometry arithmetic unit, while the other graphics chip may include a pixel arithmetic unit. Alternatively only one of the graphics chips may include a dedicated unit for texture mapping. The two graphics chips may both have the graphics processing function and differ only in rendering processing performance.

The first GPU 100 may serve as a master GPU which performs primary rendering processing, while the second GPU 200 may serve as a slave GPU which performs secondary rendering processing under the control of the master GPU.

In this way, dividing processing according to suitability between the first GPU 100 and the second GPU 200, which differ in processing function or memory bandwidth, allows the whole rendering processing to be performed efficiently.

Even if there is a processing bottleneck in one graphics processor, the other graphics processor can continue the processing in parallel. Providing the specifications of both graphics processors to programmers accordingly allows programming of rendering processing with increased efficiency by switching between the graphics processors within the multi-graphics processor system 400 having dual chips.

As still another configuration of the multi-graphics processor system 400, the first GPU 100 may be a chip that succeeds the second GPU 200. In this case, if a system which includes only the first GPU 100 is provided, some applications executable on the second GPU 200, such as a game, might fail to run due to incompatibility. This is addressed by proving a multi-graphics processor system which includes both the new-generation first GPU 100 and the older-generation second GPU 200.

Accordingly, the compatibility of the applications is maintained in such a manner that older-generation applications are executed by the second GPU 200 and video data of the second GPU 200 are sent to the first GPU 100 so as to be output from the first GPU 100. Moreover, when the older-generation applications are no longer used and there is no need to maintain the compatibility, the second GPU 200 may be removed from the system so that the system continues to be operated only with the first GPU 100. By maintaining compatibility with a dual-graphic chip configuration and removing the older-generation graphics chip as necessary, flexible product line-up adapted to the particular release date of products or user needs can be achieved.

What is claimed is:

1. A multi-graphics processor system comprising: a main processor; a first graphics processor, which is connected to the main processor via an input/output interface; a second graphics processor, which is connected to the first graphics processor via an external connection interface; a relay interface provided in the first graphics processor, which is used when the main processor communicates with the second graphics processor via the external connection interface; and an arbiter included in the first graphics processor that receives data from the main processor, the data including a destination address of either the first graphics processor or the second graphics processor, wherein the arbiter distributes the data received from the main processor in a time-sharing manner such that data with a destination address of the first graphics processor is allocated to be communicated between the main processor and a processor core within the first graphics processor to be processed only by the first graphics processor, and data with a destination address of the second graphics processor is allocated to be communicated between the main processor and the relay interface to be processed only by the second graphics processor, wherein the first graphics processor and second graphics processor process data in parallel, and wherein the main processor is operable to communicate with the second graphics processor via the relay interface provided in the first graphics processor, after receiving a signal indicating the timing of data communication, the signal being transmitted from the relay interface.

2. The multi-graphics processor system according to claim 1, wherein the relay interface in the first graphics processor includes a write buffer to be used when the main processor writes data to the second graphics processor, and wherein, if there is an available space in the write buffer, a buffer-space notification signal is sent to the main processor, and the main processor then writes data in the write buffer after receiving the buffer-space notification signal.

3. The multi-graphics processor system according to claim 2, wherein the second graphics processor executes commands in order, and
  wherein the write buffer is a FIFO queue in which data are queued in an order of issue of write commands, the write commands being issued in order to the second graphics processor by the main processor, and the queued data being sent in FIFO order to the second graphics processor.

4. The multi-graphics processor system according to claim 1, wherein the second graphics processor is an embedded memory processor chip, in which a processor core and a video memory are integrated on a single chip.

5. The multi-graphics processor system according to claim 1, wherein the first graphics processor includes a processor core which is connected to a frame buffer via a bus.

6. The multi-graphics processor system comprising:
  a main processor;
  a first graphics processor, which is connected to the main processor via an input/output interface;
  a second graphics processor, which is connected to the first graphics processor via an external connection interface; and
  a relay interface provided in the first graphics processor, which is used when the main processor communicates with the second graphics processor via the external connection interface,
  wherein the main processor is operable to communicate with the second graphics processor via the relay interface provided in the first graphics processor, after receiving a signal indicating the timing of data communication,
  wherein the relay interface in the first graphics processor includes a read buffer to be used when the main processor reads data from the second graphics processor,
  wherein, when the read buffer fills up, a buffer-full notification signal is sent to the main processor, and the main processor then reads the data stored in the read buffer after receiving the buffer-full notification signal, and
  wherein the first graphics processor includes an arbiter, which receives data from the main processor to be processed by either the first graphics processor or the second graphics processor, and which allocates data to be communicated between the main processor and a processor core within the first graphics processor to be processed only by the first graphics processor and data to be communicated between the main processor and the relay interface to be processed only by the second graphics processor.

7. The multi-graphics processor system according to claim 6, wherein the second graphics processor executes commands in order, and
  wherein the read buffer is a double buffer in which data are buffered in double buffering mode, the data having been read from the second graphics processor in response to read commands, the read commands being issued out of order to the second graphics processor by the main processor, and the buffered data being read out of order by the main processor.

8. A multi-graphics processor system comprising: a first graphics processor, which is connected to a main processor via an input/output interface; a second graphics processor, which is connected to the first graphics processor via an external connection interface; a relay interface provided in the first graphics processor, which is used when the main processor communicates with the second graphics processor via the external connection interface; and an arbiter included in the first graphics processor that receives data from the main processor, the data including a destination address of either the first graphics processor or the second graphics processor, wherein the arbiter distributes the data received from the main processor in a time-sharing manner such that data with a destination address of the first graphics processor is allocated to be communicated between the main processor and a processor core within the first graphics processor to be processed only by the first graphics processor and data with a destination address of the second graphics processor is allocated to be communicated between the main processor and the relay interface to be processed only by the second graphics processor, wherein the first graphics processor and second graphics processor process data in parallel, and wherein the relay interface is configured to send a signal indicating the timing of data communication to the main processor, before the main processor starts to communicate with the second graphics processor via the relay interface provided in the first graphics processor.

9. A graphics processor comprising: an input/output interface via which the graphics processor is connected to a main processor; an external connection interface via which the graphics processor is connected to a second graphics processor; a relay interface which is used when the main processor communicates with said second graphics processor via the external connection interface; and an arbiter interface via which data is received from the main processor, the data including a destination address of either the first graphics processor or the second graphics processor, wherein the arbiter distributes the data received from the main processor in a time-sharing manner such that data with a destination address of the first graphics processor is allocated to be communicated between the main processor and a processor core within the first graphics processor to be processed only by the first graphics processor and data with a destination address of the second graphics processor is allocated to be communicated between the main processor and the relay interface to be processed only by the second graphics processor, wherein the first graphics processor and second graphics processor process data in parallel, and wherein the relay interface is configured to send a signal indicating the timing of data communication to the main processor, before the main processor starts to communicate with said second another graphics processor via the relay interface provided in the first graphics processor.

10. A data transfer method which is performed in a multi-graphics processor system, the multi-graphics processor system comprising: a first graphics processor, which is connected to an input/output interface in a main processor; a second graphics processor, which is connected to an external connection interface in the first graphics processor, a relay interface provided in the first graphics processor; and an arbiter included in the first graphics processor; the data transfer method comprising: receiving via the arbiter data from the main processor, the data including a destination address of either the first graphics processor or the second graphics processor; distributing the data received from the main processor in a time-sharing manner such that data with a destination address of the first graphics processor is allocated to be processed by the first graphics processor, and data with a destination address of the second graphics processor is allocated to be sent to the relay interface to be processed only by the second graphics processor; communicating between the main processor and the second graphics processor via the relay interface after the main processor receives a signal from the relay interface indicating the timing of data communication from a buffer for data communication, and processing data by the first graphics processor and by the second graphics processor in parallel.

* * * * *